(12) United States Patent
Woo et al.

(10) Patent No.: US 8,721,402 B2
(45) Date of Patent: May 13, 2014

(54) DUST COLLECTION DEVICE FOR SANDING TOOL

(75) Inventors: Edward J. Woo, Woodbury, MN (US); Seyed A. Angadjivand, Woodbury, MN (US); Wenli Wang, Woodbury, MN (US); John F. Reed, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 639 days.

(21) Appl. No.: 12/810,247

(22) PCT Filed: Dec. 23, 2008

(86) PCT No.: PCT/US2008/088093
§ 371 (c)(1),
(2), (4) Date: Jun. 23, 2010

(87) PCT Pub. No.: WO2009/086339
PCT Pub. Date: Jul. 9, 2009

(65) Prior Publication Data
US 2010/0285728 A1    Nov. 11, 2010

Related U.S. Application Data

(60) Provisional application No. 61/016,854, filed on Dec. 27, 2007.

(51) Int. Cl.
*B24B 55/04*       (2006.01)
*B03C 3/00*        (2006.01)
*B01D 46/00*       (2006.01)

(52) U.S. Cl.
USPC ............... 451/453; 96/69; 55/382; 55/385.1; 55/486; 55/DIG. 2; 55/DIG. 39

(58) Field of Classification Search
USPC ......... 451/344, 354, 355, 356, 357, 358, 359, 451/453, 456; 96/69; 55/382, 385, 486, 55/DIG. 39, DIG. 2; 15/347, 330, DIG. 8
IPC .............. B01D 46/00; B24B 55/04; B03C 3/00
See application file for complete search history.

(56) References Cited

U.S. PATENT DOCUMENTS 1,999,826 A * 4/1935 Snell ............................. 15/351
2,804,166 A   8/1957 Stevens et al.
(Continued)

FOREIGN PATENT DOCUMENTS

DE           46669      3/1889
DE       102 51 564    5/2004
(Continued)

OTHER PUBLICATIONS

ASTM D 257-93, (1993).
(Continued)

*Primary Examiner* — Joseph J Hail
*Assistant Examiner* — Marc Carlson
(74) *Attorney, Agent, or Firm* — Scott A. Baum

(57) ABSTRACT

A dust collection device for a sanding tool includes a bag having a sidewall with an inner surface and a coupler attached to the bag. The sidewall comprises at least one filter layer and an outer support layer. A sleeve having an outer surface, a sleeve sidewall, a first end, a second end, and at least one gap at either the first end or the second end is positioned within the bag. The sleeve's first end is positioned adjacent the coupler to direct incoming air towards the sleeve and the sleeve is positioned within the bag such that a bypass volume is present between the outer surface and the inner surface.

21 Claims, 7 Drawing Sheets

(56) References Cited

U.S. PATENT DOCUMENTS

| | | | | |
|---|---|---|---|---|
| 3,676,986 | A | 7/1972 | Reiling | |
| 3,938,283 | A * | 2/1976 | Keith, Jr. | 451/344 |
| 3,997,305 | A * | 12/1976 | Ulvestad et al. | 55/341.1 |
| 4,072,483 | A * | 2/1978 | Doyle, Jr. | 55/372 |
| 4,215,682 | A * | 8/1980 | Kubik et al. | 128/205.29 |
| RE30,782 | E | 10/1981 | Van Turnhout | |
| 4,352,684 | A * | 10/1982 | Amberkar | 55/382 |
| 4,375,718 | A | 3/1983 | Wadsworth et al. | |
| 4,488,883 | A * | 12/1984 | Philp | 55/311 |
| 4,588,537 | A | 5/1986 | Klaase et al. | |
| 4,592,815 | A | 6/1986 | Nakao | |
| 4,675,032 | A * | 6/1987 | Genovese et al. | 95/282 |
| 4,798,850 | A | 1/1989 | Brown | |
| 4,831,685 | A * | 5/1989 | Bosyj et al. | 15/344 |
| 4,838,907 | A * | 6/1989 | Perry | 55/381 |
| 4,844,967 | A | 7/1989 | Goralski et al. | |
| 4,917,942 | A | 4/1990 | Winters | |
| 5,027,470 | A * | 7/1991 | Takashima | 15/385 |
| 5,035,239 | A | 7/1991 | Edwards | |
| 5,074,997 | A | 12/1991 | Riley et al. | |
| 5,230,800 | A | 7/1993 | Nelson | |
| 5,240,484 | A * | 8/1993 | Genovese et al. | 96/226 |
| 5,259,087 | A * | 11/1993 | Loveless et al. | 15/327.6 |
| 5,308,369 | A * | 5/1994 | Morton et al. | 55/379 |
| 5,370,597 | A * | 12/1994 | Genovese et al. | 493/186 |
| 5,496,507 | A | 3/1996 | Angadjivand et al. | |
| 5,507,847 | A * | 4/1996 | George et al. | 55/486 |
| 5,522,908 | A | 6/1996 | Frey | |
| 5,581,842 | A * | 12/1996 | Seith | 15/347 |
| 5,647,881 | A * | 7/1997 | Zhang et al. | 55/382 |
| 5,690,710 | A * | 11/1997 | Stephan | 55/366 |
| D389,963 | S | 1/1998 | Scanlon et al. | D32/31 |
| 5,704,956 | A * | 1/1998 | Loveless et al. | 55/305 |
| 5,755,962 | A * | 5/1998 | Gershenson et al. | 210/452 |
| 5,792,242 | A * | 8/1998 | Haskett | 96/68 |
| 5,908,598 | A | 6/1999 | Rousseau et al. | |
| 6,156,086 | A * | 12/2000 | Zhang | 55/382 |
| 6,171,369 | B1 | 1/2001 | Schultink et al. | |
| 6,183,536 | B1 * | 2/2001 | Schultink et al. | 95/57 |
| 6,219,880 | B1 * | 4/2001 | Worden et al. | 15/347 |
| 6,251,154 | B1 | 6/2001 | Van Rossen | |
| 6,279,570 | B1 | 8/2001 | Mittlestadt et al. | |
| 6,348,078 | B1 * | 2/2002 | Crismore | 55/361 |
| 6,372,004 | B1 * | 4/2002 | Schultink et al. | 55/382 |
| 6,397,458 | B1 | 6/2002 | Jones et al. | |
| 6,398,847 | B1 | 6/2002 | Jones et al. | |
| 6,409,806 | B1 | 6/2002 | Jones et al. | |
| 6,471,751 | B1 | 10/2002 | Semanderes et al. | |
| 6,514,131 | B1 | 2/2003 | Reich et al. | |
| 6,514,325 | B2 * | 2/2003 | Cox et al. | 96/69 |
| 6,562,112 | B2 | 5/2003 | Jones et al. | |
| 6,669,761 | B2 * | 12/2003 | Schultheiss et al. | 96/66 |
| 6,673,136 | B2 * | 1/2004 | Gillingham et al. | 95/273 |
| 6,875,346 | B2 * | 4/2005 | Fox et al. | 210/167.12 |
| 6,923,182 | B2 | 8/2005 | Angadjivand et al. | |
| 6,966,939 | B2 * | 11/2005 | Rammig et al. | 55/486 |
| 6,988,293 | B2 * | 1/2006 | Ritter | 15/347 |
| 7,000,287 | B2 * | 2/2006 | Valentini | 15/323 |
| 7,744,680 | B2 * | 6/2010 | Schultink et al. | 95/273 |
| 8,070,862 | B2 * | 12/2011 | Woo et al. | 96/69 |
| 8,087,124 | B2 * | 1/2012 | Wolfe, Jr. | 15/347 |
| 2001/0042361 | A1 * | 11/2001 | Cox et al. | 55/382 |
| 2002/0031992 | A1 * | 3/2002 | Clowers et al. | 451/357 |
| 2003/0134515 | A1 | 7/2003 | David et al. | |
| 2004/0187449 | A1 | 9/2004 | Witter | |
| 2004/0211160 | A1 * | 10/2004 | Rammig et al. | 55/382 |
| 2004/0221416 | A1 * | 11/2004 | Ritter | 15/347 |
| 2004/0250518 | A1 | 12/2004 | Kao | |
| 2004/0255783 | A1 * | 12/2004 | Graham et al. | 96/69 |
| 2005/0037699 | A1 | 2/2005 | Park | |
| 2006/0150590 | A1 | 7/2006 | Kramer | |
| 2006/0248846 | A1 * | 11/2006 | Kramer et al. | 52/741.1 |
| 2007/0066197 | A1 | 3/2007 | Woo et al. | |
| 2007/0066198 | A1 | 3/2007 | Rambosek et al. | |
| 2007/0066199 | A1 | 3/2007 | Woo et al. | |
| 2007/0251049 | A1 * | 11/2007 | Wolfe, Jr. | 15/347 |
| 2007/0251198 | A1 | 11/2007 | Witter | |
| 2010/0058553 | A1 * | 3/2010 | Marshall et al. | 15/327.6 |
| 2011/0239599 | A1 | 10/2011 | Woo | |
| 2011/0308036 | A1 * | 12/2011 | Engstrom et al. | 15/347 |

FOREIGN PATENT DOCUMENTS

| | | |
|---|---|---|
| EP | 1 285 727 | 2/2003 |
| EP | 1 462 179 | 10/2004 |
| EP | 1 477 273 | 11/2004 |
| EP | 1 506 840 | 2/2005 |
| GB | 2 402 903 | 12/2004 |
| JP | 59/228920 | 12/1984 |
| JP | 2001-179627 | 7/2001 |
| JP | 2003-231058 | 8/2003 |
| WO | WO 95/05232 | 2/1995 |
| WO | WO 95/05501 | 2/1995 |
| WO | WO 2008/033972 | 3/2008 |

OTHER PUBLICATIONS

ASTM D 5736-95 (Reapproved 2001).
ASTM D 737-04 (Reapproved 2008).
Wente, V. A. et al., "Manufacture of Superfine Organic Fibers", Report No. 4364 of the *Naval Research Laboratories*, published May 25, 1954.
Wente, V. A., "Superfine Thermoplastic Fibers", *Industrial Engineering Chemistry*, vol. 48, pp. 1342 et seq. (1956).
Product Catalog Item, "3M™ High Efficiency Filter AS/140/25", 3M Company, St. Paul, Minnesota, USA, [retrieved from the internet on Aug. 21, 2008] URL <http://solutions.3m.com/wps/portal/3M/en_US/Health/Safety/Products/Catalog/?PC_7_RJH9U5230GE3E>.

* cited by examiner

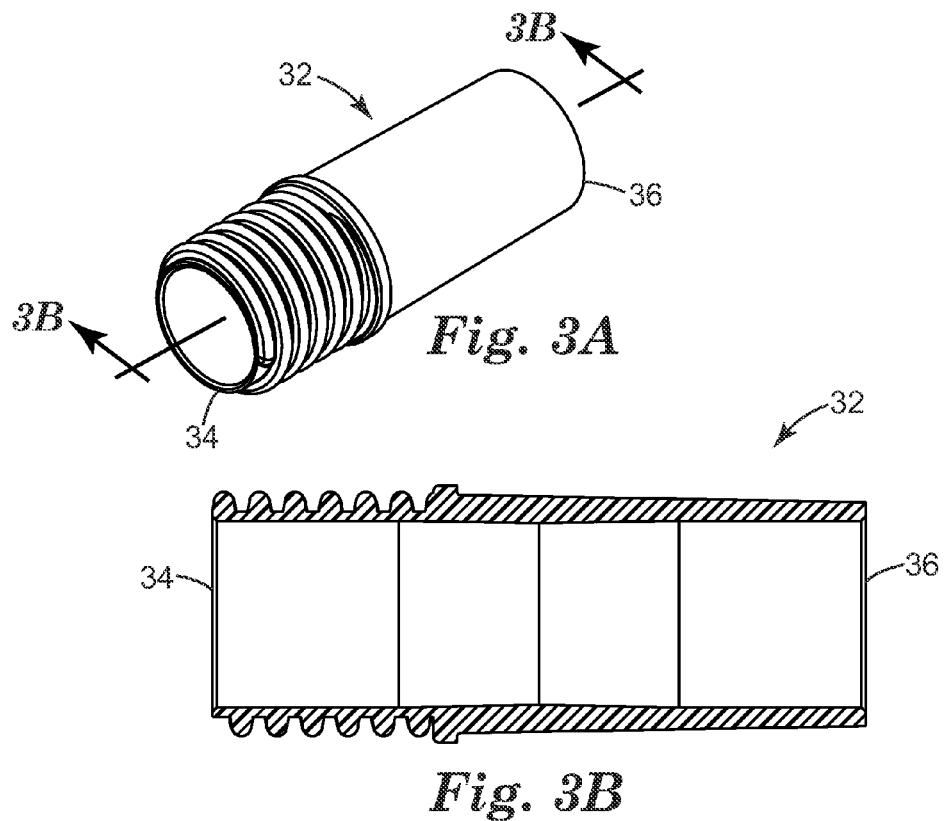
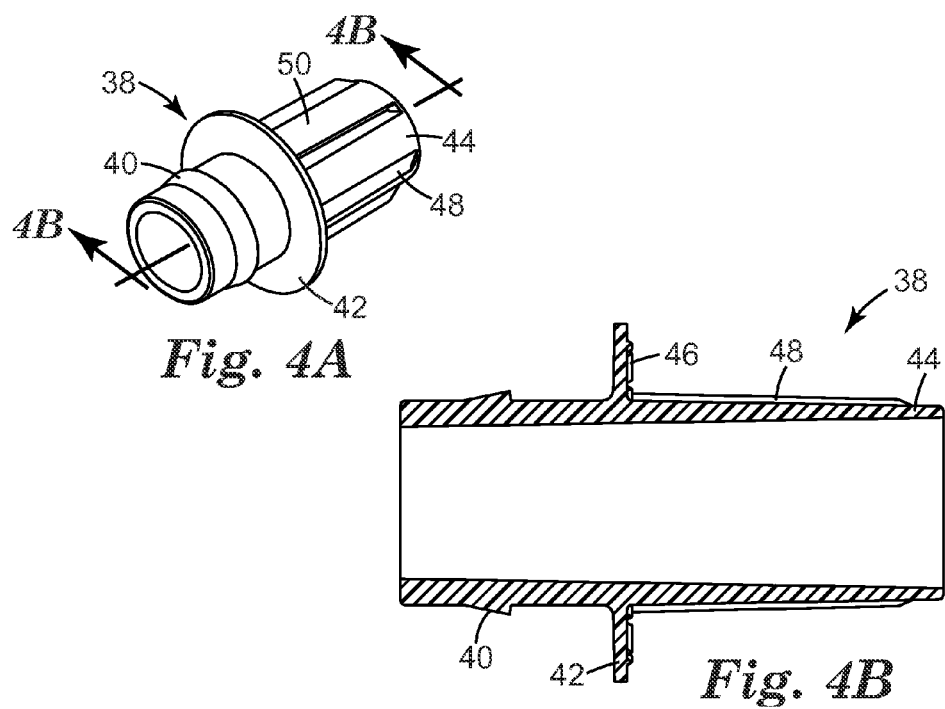

DUST COLLECTION DEVICE FOR SANDING TOOL

CROSS REFERENCE TO RELATED APPLICATIONS

This application is a national stage filing under 35 U.S.C. 371 of PCT/US2008/088093, filed Dec. 23, 2008, which claims priority to Provisional Application No. 61/016,854, filed Dec. 27, 2007, the disclosures of which are incorporated by reference in their entirety herein.

BACKGROUND

Sanding tools, such as random orbit sanders, are frequently powered by a pneumatic compressed air supply. Pneumatically powered sanders can be designed to create a self-generated vacuum to capture dust and debris by sending the exhaust air from the pneumatic motor through a venturi in the exhaust air stream to create a suction port. The suction is directed with shielding and porting to the surface of the work piece through utilization of a ventilated abrasive article and back-up pad having a plurality of dust transport holes. The dust laden air stream after the venturi can be directed to a dust capture bag that is attached to the exhaust port (dust exit port) of the sander.

Typically, a cloth or paper capture bag is attached to a vacuum hose connected to the dust exit port, or the bag is attached to the dust exit port directly to filter the exhaust air and to capture the sanding dust and debris. While the cloth dust bag functions to capture some of the dust, frequently very fine particles of dust are not retained inside the cloth dust bag. Additionally, depending on the type and size distribution of the sanding dust, the pores in the cloth bag can be quickly plugged greatly reducing the efficiency of the bag to collect further dust and debris. Once plugged up, the cloth dust bag must be removed, emptied, and cleaned of the residual dust before sanding can continue. Furthermore, once the dust is collected within the cloth bag, the dust can shift in the bag causing a reduction in the ability of the cloth bag to capture further dust. For example, when sanding on a vertical surface the captured dust within the cloth bag may partially block or obstruct the entry port into the cloth bag depending on the orientation of the cloth bag with respect to the force of gravity.

SUMMARY

To enhance the dust collection for sanding tools, what is needed is an improved dust collection device that has improved operating life, improved dust collection ability, or improved dust collection when sanding vertical surfaces. The inventors have determined that by utilizing a dust collection device having at least a three-layer sidewall construction, the capture of fine dust particles is increased, the effective life of the dust collection device is also increased, and improved dust collection while sanding vertical surfaces results.

In one aspect, the disclosure resides in a dust collection device for a sanding tool comprises a bag having a sidewall and a coupler attached to the bag. The sidewall includes a first filter layer, a second filter layer, and an outer support layer. The first filter layer comprises a plurality of fibrillated electrostatically charged electret fibers forming a nonwoven web; the first filter layer having a total pressure drop between about 1.0 to about 4.0 mm $H_2O$ or between about 0.1 to about 4.0 mm $H_2O$, and the first filter layer having a total basis weight between about 100 to about 300 gram/$m^2$ or between about 50 to about 450 gram/$m^2$. The second filter layer comprises a melt blown microfiber nonwoven web; the second filter layer having a total pressure drop between about 10 to about 18 mm $H_2O$ or between about 5.5 to about 20 mm $H_2O$, and the second filter layer having a total basis weight between about 25 to about 75 grams/$m^2$ or between about 15 to about 75 grams/$m^2$ In another aspect, the disclosure resides in a kit comprising a dust collection device for a sanding tool comprising a bag having a sidewall and a coupler having a barbed first end attached to the bag. The sidewall includes a first filter layer, a second filter layer, and an outer support layer. The first filter layer comprises a plurality of fibrillated electrostatically charged electret fibers forming a nonwoven web; the first filter layer having a total pressure drop between about 1.0 to about 4.0 mm $H_2O$ or between about 0.1 to about 4.0 mm $H_2O$, and the first filter layer having a total basis weight between about 100 to about 300 gram/$m^2$ or between about 50 to about 450 gram/$m^2$. The second filter layer comprises a melt blown microfiber nonwoven web; the second filter layer having a total pressure drop between about 10 to about 18 mm $H_2O$ or between about 5.5 to about 20 mm $H_2O$, and the second filter layer having a total basis weight between about 25 to about 75 grams/$m^2$ or between about 15 to about 75 grams/$m^2$. Included in the kit is an adapter having a first threaded end and a second internally tapered end. Included in the kit are instructions for attaching the first threaded end of the adapter to a dust exit port of the sanding tool and for inserting the barbed first end of the coupler into the second internally tapered end of the adapter.

In another embodiment, the disclosure resides in a method of collecting dust from a sanding tool comprising attaching the dust collection device to the dust exit port of the sanding tool.

The inventors have also discovered that by including a sleeve inside of the dust collection device, the dust collection efficiency is enhanced. The sleeve has a gap at one end or both ends that allows the incoming air to divert through the gap should the sleeve become plugged up. The gap can act as a flow control valve that apportions more airflow through the gap as the permeability of the sleeve is reduced by the collected debris.

In another aspect, the disclosure resides in a dust collection device for a sanding tool including a bag having a sidewall with an inner surface and a coupler attached to the bag. The sidewall comprises at least one filter layer and an outer support layer. A sleeve has an outer surface, a sleeve sidewall, a first end, a second end, and at least one gap at either the first end or the second end. The sleeve's first end is positioned adjacent the coupler to direct incoming air towards the sleeve and the sleeve is positioned within the bag such that a bypass volume is present between the outer surface and the inner surface.

BRIEF DESCRIPTION OF THE DRAWINGS

It is to be understood by one of ordinary skill in the art that the present discussion is a description of exemplary embodiments only, and is not intended as limiting the broader aspects of the present invention, which broader aspects are embodied in the exemplary construction.

FIGS. 3A and 3B illustrate views of an adapter for use with the dust collection device.

FIGS. 4A and 4B illustrate views of a coupler for the dust collection device.

Figure 1:
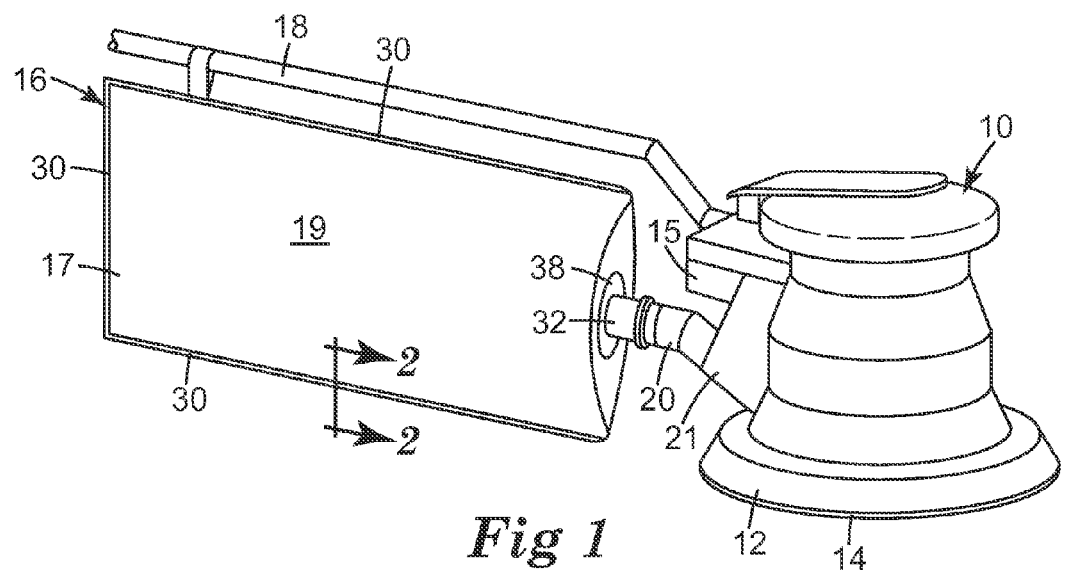
FIG. 1 illustrates a perspective view of a sanding tool with an attached dust collection device.

Repeated use of reference characters in the specification and drawings is intended to represent the same or analogous features or elements of the invention.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein "layer" means that the material forming the layer has substantially the same mechanical structure and chemical composition.

As used herein "ply" means an individual separable sheet. For example, a layer of facial tissue often contains two plies of facial tissue material that form the sheet of tissue paper that is dispensed from the carton.

DETAILED DESCRIPTION

Referring to FIG. 1, a sanding tool 10 is illustrated. The sanding tool includes a back-up pad 12 to which an abrasive article 14 is attached. The back-up pad and abrasive article each contains a plurality of holes to enable the movement of dust and debris from the sanding surface to a dust collection device 16 under vacuum action. In one embodiment, the sanding tool 10 comprises a pneumatic random orbit sander that is attachable to a source of compressed air by an air line 18. Within the pneumatic random orbit sander, the compressed air is routed through an air motor that rotates and oscillates the back-up pad 12 and the abrasive article 14. At least a portion of the exhaust air of the motor can be routed through a venturi 15 and out a dust exit port 20 into the dust collection device 16. The dust collection device 16 includes a bag 17 and a coupler 38 for attaching the dust collection device to the dust exit port 20 of the sanding tool 10 such that the dust collection device is in fluid communication with the dust exit port. Routing the exhaust air through the venturi creates a low pressure zone due to the venturi effect, and the low pressure zone can be connected by a duct 21 to the holes in the back-up pad 12 to create a vacuum adjacent the work piece that sucks the dust and debris into the dust collection device 16.

To quantify the suction of several commercially available pneumatic sanders, the backup pad 12 with dust capture holes was placed into a closed container (one-gallon paint container with a 10.2 cm opening in the top). Vinyl adhesive tape was used to seal off any air leakage between the opening into the container and the bottom of the sander's shroud while ensuring that the backup pad 12 was able to rotate freely within the closed container. A small sealed inlet into the closed container was connected to an air flow meter to measure the volume of air drawn though the backup pad. Four different commercially available sanders were tested at an operating pressure of 90 psig (620 kPa). The maximum self-generated suction through the backup pad was measured to be between about 6.7 cfm (190 liters/min) to about 13.5 cfm (382 liters/min). The air flow meter was then attached to the dust exit port 20 of the pneumatic sander. The total air flow from the dust exit port 20 at 90 psig (620 kPa) was measured to be between about 21 cfm (595 liters/min) to about 29 cfm (821 liters/min) when the pneumatic sanders were operated at 90 psig (620 kPa).

From the above tests, it can be determined that the total airflow though the dust collection device 16 is quite large. Furthermore, the small size of the dust collection device 16 means that the airflow per unit area (e.g., $cfm/ft^2$) through the sidewall 19 of the dust collection device 16 is also quite large. Thus, the dust collection device 16 should allow for high airflows, such as between about 15 to about 35 cfm (425 to 990 liters/min), at pressures of between about 50 to about 90 psig (345 to 620 kPa) without a significant pressure drop, while simultaneously trapping very small particles of dust from a heavily loaded contaminant stream of air picked up from adjacent the work surface during sanding.

Figure 2:
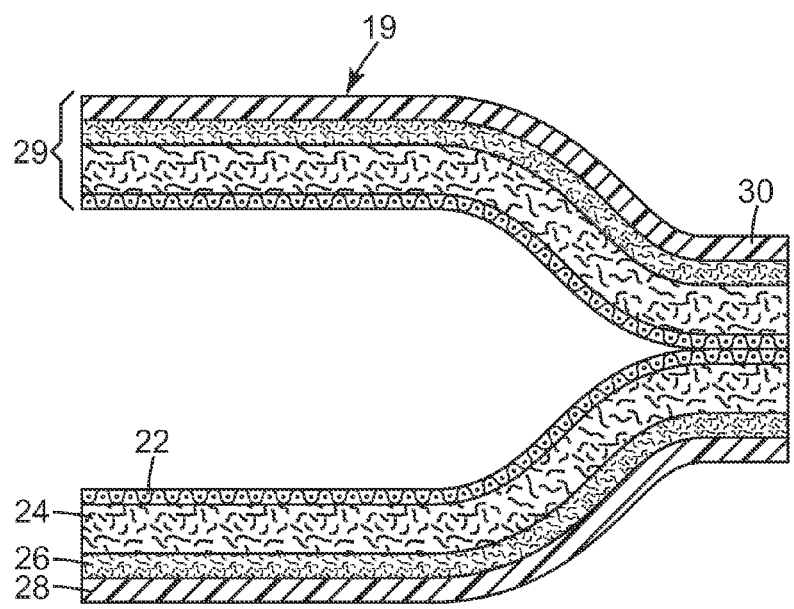
FIG. 2 illustrates a cross section of the sidewall of the duct collection device taken at 2-2 of FIG. 1.

Referring to FIG. 2, a cross section of the dust collection device 16 is illustrated. The sidewall 19 of the dust collection device 16 comprises four layers, an optional inner support layer 22, a first filter layer 24, a second filter layer 26 and an outer support layer 28. The optional inner support layer 22 and the outer support layer 28 are provided for the protection of the filter layers and to prevent the dust collection device from bursting, rupturing or tearing during operation at high pressures. The four layers are positioned in a face to face relationship thereby forming a composite sidewall material 29.

The first filter layer 24 can be comprised of a lofty nonwoven web of charged electret containing fibers, which can be any suitable open nonwoven web of charged fibers. The filter layer 24 could be formed of the split fibrillated charged fibers described in U.S. Pat. No. RE 30,782 to Van Turnhout. The electret fibers in U.S. Pat. No. RE 30,782 are formed from a corona charged film that is fibrillated to form the charged fibers. This charging method provides a particularly high density of injected charges in the finished fibers. The charged fibers can then be formed into a nonwoven filter web by common methods such as carding or air laying. For example, the electret fibers can be carded to form a nonwoven web and the nonwoven web then needle-punched to increase its integrity. Optionally, the nonwoven web of fibrillated electret fibers can be joined to a supporting scrim such as disclosed in U.S. Pat. No. 5,230,800 to Nelson and in U.S. Pat. No. 5,792, 242 to Haskett.

The nonwoven web of fibrillated electret fibers and optional support scrim, when joined together by a needle-punching operation, produces a filter medium which is extremely uniform in its physical and performance characteristics. Desirably, the optional scrim support should be an extremely open material having a large number of discrete open areas, which open areas pass through the scrim from one face to the opposite face. These discrete open areas should have an average cross-sectional area of at least 0.25 $mm^2$, most preferably at least 1.0 $mm^2$; however, the individual open areas can range in size from 0.1 $mm^2$ up to 10 $mm^2$ or larger. Preferably, the open areas have a non-tortuous path through the scrim, most preferably the open areas extend directly from one face to the opposite face (e.g., as a column).

Generally, the ratio of open area average path length through the scrim to the average scrim thickness is from 3 to 1, preferably from 2 to 1 and less. The scrim open area can also be described in terms of an Effective Circular Diameter (ECD) which is the diameter of the largest circle that can fit into an individual discrete open area. The average ECD is generally at least 300 µm, preferably at least 500 µm. Despite the extremely open nature of the scrim support material, it should be reasonably strong, generally having a tensile strength of at least 50 kg/m, preferably at least 100 kg/m. The overall pressure drop of the scrim material should be relatively small in comparison to the pressure drop across the electret-charged filter web material (e.g., less than 50 percent preferably less than 30 percent of the filter web pressure drop) and generally will have a pressure-drop of less than 1.5 mm $H_2O$, preferably less than 1.0 mm $H_2O$, and most preferably less than 0.5 mm $H_2O$ at 85 liters/minute air flow as tested by the Pressure Drop Measurement test method.

The optional scrim material can be formed of any suitable material such as a thermoplastic polymer, ductile metal or the like. Preferably, the scrim is formed of thermoplastic fibers such as a scrim or netting material such as the cross-laminated polyethylene fibers sold under the trade name CLAF by Amoco. Other cross laminated fibrous webs could also be used, with the lamination done by conventional techniques such as heat, ultrasonic or adhesive lamination.

The electret fibers can be charged by known methods, e.g., by use of corona discharge electrodes or high-intensity electric fields or by tribo-charging (as described in U.S. Pat. No. 4,798,850 to Brown). The fibers can be charged during fiber formation, prior to or while forming the fibers into the filter web or subsequent to forming the filter web. The fibers forming the filter web can even be charged subsequent to being joined to the scrim support layer.

Alternatively, the first filter layer 24 can comprise a lofty nonwoven web such as a carded polyester web, carded polypropylene web, or carded polyolefin web. The lofty nonwoven can be optionally charged to enhance its performance. One suitable first filter layer material is a carded polyester nonwoven web available from Precision Textiles, Totowa, N.J.

The first filter layer 24 can be made of a single ply or multiple plies placed in a face to face relationship. Depending on the uniformity of the manufacturing process, it may be desirable to stack multiple plies to create the first filter layer 24 rather than form one individual thicker layer. The first filter layer 24 can have a total basis weight ranging between about 100 to about 300 grams/m$^2$, or between about 115 to 250 grams/m$^2$, or between about 125 to 250 grams/m$^2$, or between about 140 to about 200 grams/m$^2$, or between about 50 to about 450 grams/m$^2$, when used as a first filter in a dust collection device 16. Generally, the first filter layer 24 has a combined total pressure drop of between about 0.1 to about 4.0 mm $H_2O$, or between about 0.15 to about 4.0 mm $H_2O$, or between about 1.0 mm $H_2O$ to about 4.0 mm $H_2O$, or between about 1.5 to about 3.0 mm $H_2O$, or between about 1.7 to about 2.4 mm $H_2O$, or between about 0.2 to about 2.4 mm $H_2O$, or between about 0.25 to about 2.0 mm $H_2O$ at 85 liters/minute air flow as tested by the Pressure Drop Measurement test method.

The total thickness of the first filter layer 24 under a pressure of 0.05 psi with a 3.5 inch diameter platen (ASTM D5736-95 reapproved 2001) is desirably greater than about 2.5 mm, or between about 2.5 to about 4.5 mm, or between about 3.0 to about 4.0 mm, or between about 3.0 to about 8.0 mm, or between about 3.0 to about 10.0 mm, or between about 3.0 to about 12.0 mm, or between about 3.0 to about 20.0 mm. In general, sufficient thickness and basis weight should be provided to trap the dust and debris within the structure of the first filter layer 24 instead of on the layer's surface. Furthermore, the first filter layer 24 should have a total pressure drop within the specified ranges so as to not unduly impede the exhaust airflow from the sanding tool and to catch the majority of the dust and debris in the exhaust stream.

The second filter layer 26 can comprise a melt blown microfiber nonwoven web, and be optionally charged as disclosed in U.S. Pat. No. 4,917,942 to Winters. It is believed that a charged second filter layer 26 in addition to a charged first filter layer 24 is more effective in capturing dust and debris. Melt blown nonwoven webs are typically formed by the process taught in Wente, Van A., "Superfine Thermoplastic Fibers" in Industrial Engineering Chemistry, volume 48, pages 1342 et seq., (1956), or Report No. 4364 of the Naval Research Laboratories, published May 25, 1954, entitled "Manufacture of Superfine Organic Fibers" by Wente, Van A., Boone, C. D. and Fluharty, E. L., which fibers are collected in a random fashion, such as on a perforated screen cylinder or directly onto a support web or in the manner described in PCT Application No. WO 95/05232 (between two co rotating drum collectors rotating at different speeds creating a flat surface and an undulating surface). The collected material can then be subsequently consolidated, if needed, and charged, such as in the manner described in U.S. Pat. No. 4,215,682 to Kubik. Alternative charging methods to form electrets include the methods described in U.S. Pat. No. 4,375,718 or 4,592,815, or PCT application number WO 95/05501.

A variety of polymeric fiber-forming materials may be used to form the melt blown microfiber nonwoven web. The polymer may be essentially any thermoplastic fiber-forming material capable of providing a charged nonwoven web which will maintain satisfactory electret properties or charge separation. Preferred polymeric fiber-forming materials are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. The polymeric fiber-forming material also preferably is substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

The electric charge can be imparted to the melt blown microfiber nonwoven web in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. patent application number US2003/0134515 A1 to David et al., or combinations thereof.

Additives may be added to the polymer to enhance the melt blown microfiber nonwoven web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art. For example, electret charging enhancement additives are generally present in an amount less than about 5 wt. % and more typically less than about 2 wt. %.

The second filter layer 26 can be made of a single ply or multiple plies placed in a face to face relationship. Depending on the uniformity of the manufacturing process, it may be desirable to stack multiple plies to create the layer rather than form one individual thicker layer. The second filter layer 26 can have a total basis weight ranging between about 25 to about 75 grams/m$^2$, or between about 40 to about 60 grams/m$^2$, or between about 15 to about 75 grams/m$^2$, or between about 20 to about 60 grams/m$^2$ when used as a second filter layer in combination with the first filter layer 24. Generally, the second filter layer 26 has a total pressure drop of between about 5.5 to about 20.0 mm H$_2$O, or between about 8 to about 18 mm H$_2$O, or between about 12 to about 15 mm H$_2$O, or between about 8.0 to about 13.0 mm H$_2$O at 85 liters/minute air flow as tested by the Pressure Drop Measurement test. The total thickness of the second filter layer 26 under a pressure of 0.05 psi with a 3.5 inch diameter platen (ASTM D5736-95 reapproved 2001) is between about 0.2 to about 1.2 mm, or between about 0.3 to about 1.0 mm, or between about 0.5 to about 0.8 mm, or between about 0.7 to about 1.0 mm. In general, the pressure drop of the second filter layer should be as low as possible to capture particles having an average particle diameter of about 0.5 micrometer or greater. If the second filter layer is too restricted, it will quickly plug rendering the dust collection device inoperable. If the second filter layer is too open, it will pass too many fine particles through to the atmosphere rendering the dust collection device ineffective.

The composite material forming the dust collection device's sidewall 19 is further provided with the optional inner support layer 22 and the outer support layer 28. Desirably, all of the layers or plies of material forming the composite sidewall material 29 are substantially unbonded to each other except at the periphery of the dust collection device 16 along a seam 30 on three sides of the bag 17. Alternatively, the individual layers or plies can be bonded to adjacent layers or plies provided that the bonding method does not significantly reduce the air flow through the composite sidewall material 29 of the dust collection device 16.

Both the inner support layer 22 and the outer support layer 28 can be formed of a nonwoven or woven fibrous material. Desirably, for ease of manufacturing, cost, and performance the outer support layer 28 and the inner support layer 22 are nonwoven fibrous web materials formed at least in part from heat-sealable or weldable thermoplastic fibers. Examples of such materials include spunbond webs, spunlace webs and consolidated carded and air-laid webs. Alternatively, other methods can be used to form the seam 30 such as stitching or adhesive in which case, the inner support layer and outer support layer (22, 28) can be a non heat-sealable, porous fibrous material, such as a paper, cloth or the like.

The inner support layer and outer support layer (22, 28) should have sufficient tensile strength to protect the first filter layer and second filter layer (24, 26) from tearing under the extremely high pressures (up to 90 psig (620 kPa)) that are present inside the dust collection device 16 when in use. Unlike conventional vacuum cleaner bags or furnace filters, the dust collection device 16 operates to filter air under a much higher pressure and under significantly greater flow rates.

The outer support layer 28 should generally have an air permeability of at least about 50 m$^3$/min/m$^2$, or at least about 100 m$^3$/min/m$^2$ or at least about 500 m$^3$/min/m$^2$ or greater as tested by ASTM D737. The basis weight of the outer support layer 28 is generally between about 10 to about 100 g/m$^2$.

The outer support layer 28 can be either bonded or non-bonded to the second filter layer 26 with the exception of the seam 30 area. However, if the outer support layer 28 is bonded to the second filter layer 26, it is done so in a manner that will not significantly decrease the open area of the composite sidewall material 29. Acceptable bonding methods include adhesives, spot ultrasonic welding or heat bonding or the like. Generally, the bonded area should be no more than 20% of the composite sidewall material's area or generally less than 10% of the area.

The inner support layer 22 should generally have an air permeability of at least about 50 m$^3$/min/m$^2$, or at least about 100 m$^3$/min/m$^2$ or greater as tested by ASTM D737. The inner support layer 22 generally has a basis weight of between about 10 to 100 g/m$^2$, or between about 15 to 40 g/m$^2$. The inner support layer 22 generally has a tensile strength of at least about 0.10 kg/cm, or at least about 0.15 kg/cm. Suitable inner support layers include spunbond webs of thermoplastic fibers, consolidated carded webs such as point bonded carded webs of polyolefin (e.g., polypropylene) staple fibers, and scrim, netting or mesh materials. When the seam 30 is a welded seam it is desirable to include a thermoplastic inner support layer 22 to assist in heat sealing the seam 30; especially, if the first filter layer 24 is quite thick or not readily melted. Desirably, the inner support layer 22 is a net or mesh type of material having a high permeability that protects the first filter layer 24, improves reliability of the welded seam 30, and minimally restricts the airflow through the composite sidewall material 29.

While not wishing to be bound by theory, the inventors believe that the improved results, as demonstrated in the following examples when the dust collection device 16 is attached to the dust exit port 20 of a sanding tool 10, occur from the selection of the materials forming the first and second filter layers (24, 26). In particular, the first filter layer 24 is used as a collection device for the course and medium particulate and the second filter layer 26 is used as a screen to prevent extremely fine particulates from escaping. Therefore, in order to maximize the life of the dust collection device, the properties of the two layers should be carefully selected. If the first filter layer is too fine, it will quickly plug up rendering the second filter layer redundant. Conversely if the first filter layer is too course, most of the dust and debris will be retained only by the second filter layer, which will become quickly plugged up.

Secondly, it is desirable that the first filter layer has a relatively open, torturous air flow path through the material such that when dust or debris plugs one area, the air flow can divert sideways through the material to a new area. In this manner, the dust does not collect primarily on the surface of the material, but will instead be drawn in and through the material filling in the interstices between the fibers forming the material. In this manner, the first filter layer acts as a collection device storing the majority of the sanding debris and sending only the very fine particles to the second filter layer. Since a significant portion of the dust and debris is stored within the structure of the first filter material 24, when the dust collection device is used in a vertical orientation there is an improvement in the efficiency of the dust collection device to store additional sanding debris. As such, there is less shifting of the debris within the dust collection device as its orientation is changed from horizontal to vertical since much of the dust is physically entrapped within the structure of the first and second filter layers (24, 26).

Referring to FIGS. 3A and 3B, an adapter 32 is illustrated. The adapter includes a first threaded end 34 and a second internally tapered end 36. The thread pitch and size on the first threaded end 34 can be changed to mate with various pitch threads used on pneumatic sanding tools. Alternatively, the first threaded end can be eliminated and another mating surface provided to engage with the dust exit port 20 of the sanding tool 10. For example, the internal bore of the first threaded end 34 can be sized as a slight interference fit with the outer bore of the dust exit port 20 for removably attaching the adapter 32 to the dust exit port 20. Thus, multiple adapters can be provided to enable use of the dust collection device 16 with multiple brands of sanding tools.

The second internally tapered end 36 of the adapter 32 can be sized for an interference fit with the coupler 38 illustrated in FIGS. 4A and 4B. The second internally tapered end 36 can optionally include a first portion that is not tapered immediately adjacent to the second end before the tapered portion of the second end begins. The coupler 38 can include a barbed first end 40, a flange 42, and a ribbed second end 44. In one embodiment, the adapter 32 is significantly longer than the barbed first end 40 such as about 2 to about 10 times, or about 3 to about 4 times the length of the first barbed end 40. A longer length adapter 32 allows for the adapter to be slipped over the dust exit port 20 of some sanding tools while simultaneously providing at least a portion of the internal bore being unobstructed for engaging with the barbed first end 40. The barbed first end 40 is sized for an interference fit with the internal bore of the second internally tapered end 36 of the adapter 32. In one embodiment, the barbed first end 40 mates with the non-tapered first portion of the second end to provide a more consistent interference fit. The interference fit should be substantially air tight at pressures of about 90 psi (620 kPa) or less.

In one embodiment, the second internally tapered end 36 had a circular cross section and the barbed first end 40 had an oval shape cross section with two opposing flat sides and two opposing curved ends similar to a speed skating rink. It is believed that having different cross sectional geometries for the second internally tapered end 36 and the barbed first end 40 provides for a tighter interference fit. To enhance the holding ability of the coupler 38 within the adapter 32 at high pressures, one of the items can be made from an elastomeric material. Desirably, the adapter 32 is made from an elastomeric material and the coupler 38 is made from a rigid plastic material. In one embodiment, the adapter 32 was made from SANTOPRENE 201-80 available from Advanced Elastomer Systems L.P., Akron, Ohio, and the coupler 38 was made from rigid polypropylene.

Referring again to FIGS. 4A and 4B, the coupler 38 is attached to the composite sidewall material 29 by the flange 42. Desirably, the flange 42 is heat welded to the composite sidewall material 29. To facilitate the heat welding, the side of the flange 42 attached to the outer support layer 28 can include a plurality of sacrificial ribs 46 that melt to the outer support layer 28. Once attached, the ribbed second end 44 of the coupler 38 is positioned inside the bag 17 of the dust collection device 16. The ribbed second end includes a plurality of gripping ribs 48 that project outwardly from a radial surface 50 of the ribbed second end. The plurality of gripping ribs 48 enables improved torque transmission through the composite sidewall material 29 to the coupler 38. This enables the coupler 38 to be readily twisted as it is force fit into the second internally tapered end 36 of adapter 32. Without the gripping ribs 48, it is more likely that the composite sidewall material 29 would be torn away from the flange 42 where it is heat sealed by the twisting motion used to insert the coupler 38 into the adapter 32. Rather than the gripping ribs 48, the second end of the coupler can have flats placed onto the radial surface 50 or the shape of the second end could be changed to a polygon such as triangular or square to improve the torque transmission.

While a specific configuration for the adapter 32 and the coupler 38 have been illustrated, other mechanical connection elements known to those of skill in the art can be used to attach the bag 17 to the dust exit port 20. For example, a flange (coupler) that slips over the outer bore of the dust exit port 20 can be provided in the sidewall 19. A strap attached near one end of the bag 17 can be used to cinch the open end of the bag to the dust exhaust port. Typical connectors used for air hoses, garden hoses, vacuum hoses and the like can be used.

In some embodiments, depending on the weight of the material collected in the bag 17, the ribbed second end 44 or the coupler's second end can be lengthened to extend a significant distance into the bag to support the bag during use. The ratio of the length, L, of the ribbed second end 44 residing inside the bag 17 to the inside length of the bag 17 can be between about 0.25 to about 0.9, or between about 0.5 to about 0.75, or between about 0.4 to about 0.8. When the length of the ribbed second end 44 or coupler's second end is increased, holes, slots, or other apertures along the length of the ribbed second end can be provided to create a diffuser such that material entering the bag 17 is spread out along the length of the ribbed second end 44.

In one embodiment, the dust collection device 16 can be made by the following steps. The composite sidewall material 29 is assembled by overlying the individual layers or plies forming the composite sidewall material shown in FIG. 2. Each layer or ply is cut to the desired width of the bag 17 and to a length twice as long as the bag 17. A hole is cut through the composite sidewall material 29 near the geometric center of the layers and the coupler 38 is inserted through the hole such that the sacrificial ribs 46 are positioned adjacent to the outer support layer 28. The composite sidewall material 29 is then heat welded to the flange 42. The composite sidewall material 29 is then folded in half lengthwise such that the barbed first end 40 of the coupler 38 is positioned at one end of the bag 17. The top, bottom, and end of the bag 17 opposite the coupler 38 are then heat sealed to form the seam 30 completing the assembly steps. In other embodiments, seam 30 may be reinforced by folding some or all of the layers together prior to heat sealing.

Another embodiment of the invention resides in a kit for sale to users of dust collection bags for sanding tools. The kit includes the dust collection device 16 with the coupler 38 attached to the bag 17, an adapter 32, and instructions for attaching the first threaded end 34 of the adapter 32 to the dust exit port 20 of a sanding tool 10. The kit can be placed into a package for sale with one or more dust collection devices included. Further steps included are instructions for inserting the barbed first end 40 of the coupler 38 into the second internally tapered end 36 of the adapter 32. The instructions provided with the kit can be written words, illustrations using pictures, drawings or photographs, or a combination of written words and illustrations that convey the working relationship of the various components in the kit and how the components are attached to a sanding tool. Alternatively, oral instructions can be provided by a sales representative who is demonstrating or selling the dust collection device 16 to a prospective customer.

Figure 6:
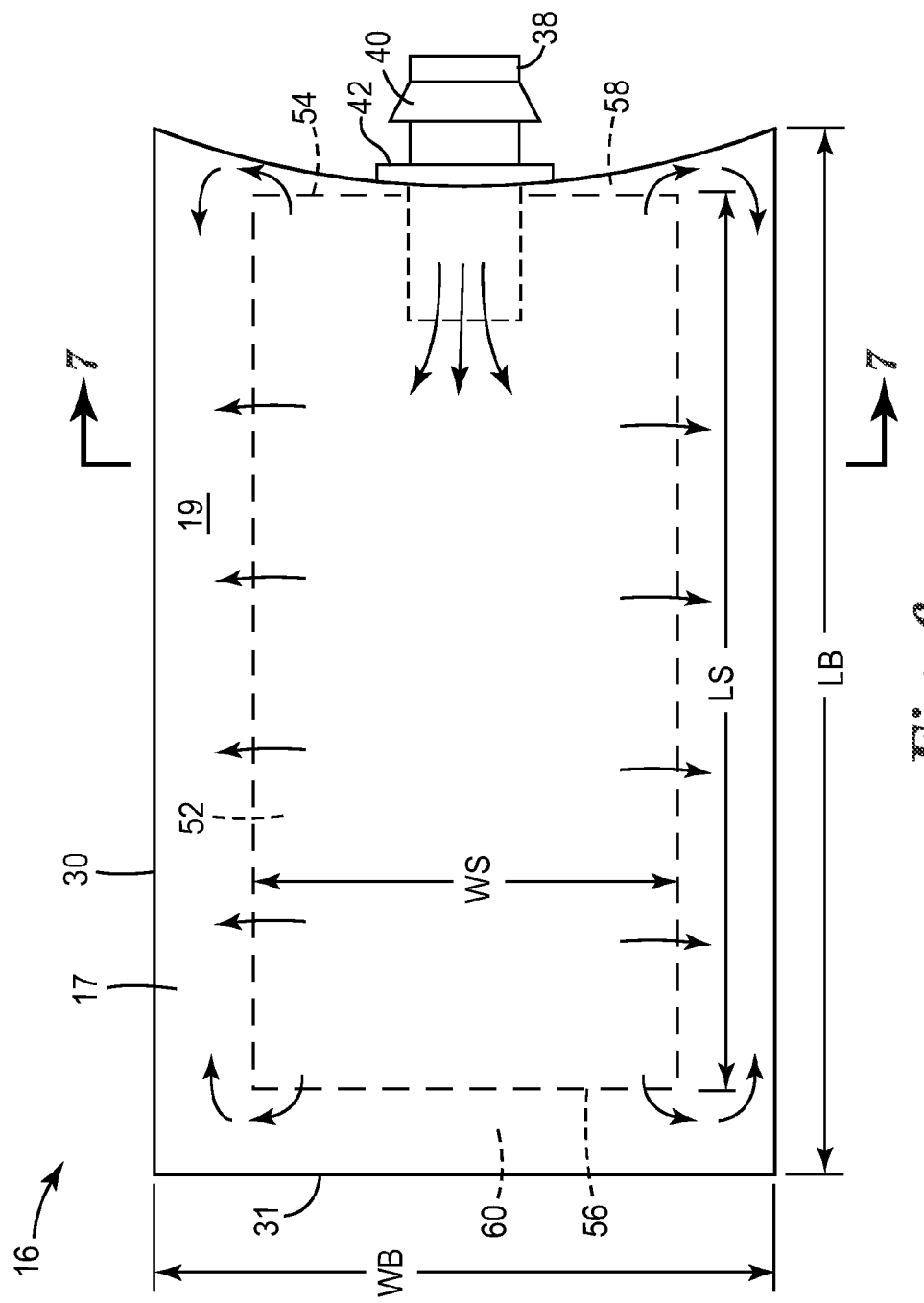
FIG. 6 illustrates a front view of another embodiment of the dust collection device.
Figure 7:
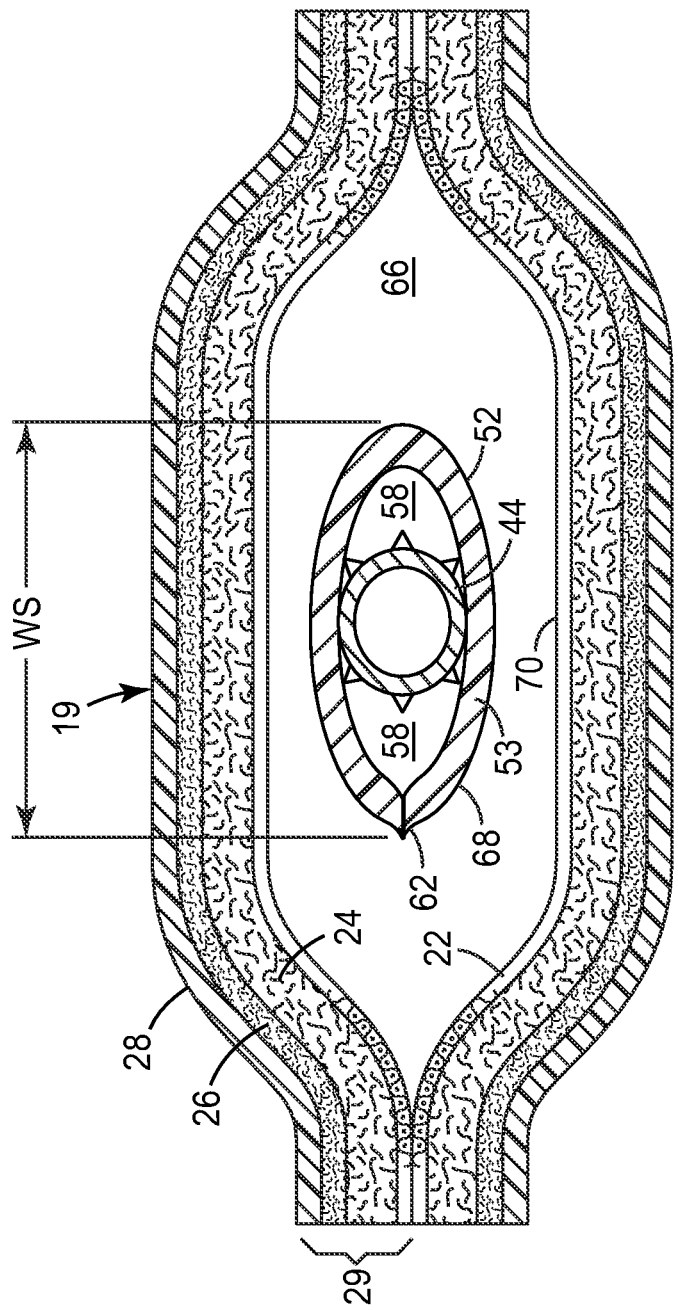
FIG. 7 illustrates a cross section of another embodiment of the dust collection device taken at 7-7 in FIG. 6.

Referring now to FIGS. 6 and 7, another embodiment of the dust collection device 16 is shown. The dust collection device 16 includes a bag 17 and a coupler 38 for attaching the dust collection device 16 to the dust exit port 20 of the sanding tool 10. In one embodiment, the sidewall 19 of the dust collection device comprises four layers, an optional inner support layer 22, a first filter layer 24, a second filter 26, and an outer support layer 28. The four layers are positioned in a face to face relationship thereby forming a composite sidewall material 29. The individual layers forming the composite sidewall material 29 can have the same material properties as previously discussed for the first embodiment of the dust collection device. In other embodiments, the sleeve 52 can be combined with a single layer bag having only an outer support layer 28, or combined with a two layer bag having an outer support layer 28 and a filter layer such as the first filter layer 24 or the second filter layer 26. The sleeve 52 can be used in conjunction with other bag constructions such as with cloth bags, paper bags, or nonwoven bags.

Positioned within the bag 17 is a sleeve 52 having a sleeve sidewall 53, a first end 54, and a second end 56. The first end 54 is inserted over the ribbed second end 44 of the coupler 38. The second end 56 is positioned near an end seam 31 located at the distal end of the dust collection device 16 opposite the coupler 38. The function of the sleeve 52 is to diffuse the incoming dust laden air and to remove at least a portion of the dust from the incoming air. By diffusing it is meant that the velocity of the incoming air is changed; meaning either its speed or its direction is altered by the sleeve 52. It is believed that by diffusing the incoming air, the filter layers in the composite sidewall material 29 are more uniformly loaded with contaminants and more air can be filtered before the filter layers in the composite sidewall become plugged with debris. Also, it is believed that the efficiency of the dust collection device is increased by collecting at least some of the larger debris particles in the sleeve thereby allowing finer particles to be collected by the composite sidewall material 29.

The inventors have discovered that it is important to leave an opening or gap at one end of the sleeve, and desirably at both ends of the sleeve. In one embodiment, a first gap 58 and a second gap 60 is present at both ends of the sleeve. If the first end 54 is sealed to the coupler's ribbed second end 44 and the second end 56 is sealed to the end seam 31 eliminating any openings or gaps, then a filter bag within a filter bag construction is produced as tested in Example 39. This construction provides only a serial flow path for the incoming air that must first pass through the sleeve 52 and then pass through the composite sidewall material 29. Once the sleeve 52 is plugged up, the efficiency of the dust collection device 16 is greatly reduced. However, by leaving a gap at least one end of the sleeve 52, the majority of the incoming air can first assume a serial flow path through the sleeve 52 and then through the composite sidewall material 29 until the sleeve becomes somewhat plugged with debris. Then the incoming air can assume a parallel flow path where a portion of the incoming air can pass directly through either the first or the second gap and out the composite sidewall material 29 while another portion of the incoming air passes through both the sleeve and the composite sidewall as best illustrated in FIG. 6. This type of airflow can continue until the sleeve 52 becomes totally plugged with debris at which time the majority of the incoming air can pass through the first or second gap and then out the composite sidewall material 29. In this manner, the gap(s) acts as a flow control valve that apportions more airflow through the gap(s) as the permeability of the sleeve 52 is reduced by the collected debris.

It has been discovered that the dust collection efficiency is improved if a gap is present at each end of the sleeve; however, a single gap at either the first or the second end of the sleeve is sufficient. It is believed that having gaps at both ends leads to more uniform loading of debris in the composite sidewall material 29. The first gap 58 can be created by sizing the sleeve 52 to have a larger internal circumference than the outer circumference of the ribbed second end 44 as best seen in FIG. 7. By varying the internal circumference of the sleeve or the outer circumference of the ribbed second end or the height of the ribs 48, a larger or smaller first gap 58 can be created. The second gap 60 can be created by positioning the second end 56 against the end seam 31 without sealing the second end in the end seam 31 or independently sealing the second end 56 during construction of the dust collection device 16. Under pressure, airflow can still pass though the second gap 60 and then through the composite sidewall since the second end 56 of the sleeve 52 is not sealed to the end of the bag 17. A more defined second gap 60 can be created by shortening the sleeve's length, LS, such that it terminates a measurable distance away from the end seam 31. By controlling the size of the gaps present at each end of the sleeve, the initial apportionment of the incoming airflow between the sleeve 52 and directly through the composite sidewall material 29 can be controlled.

The first gap 58 has a first gap area equal to the area defined by the internal circumference of the first end 54 minus the area defined by the external circumference of the ribbed second end 44. The second gap 60 has a second gap area defined by the internal circumference of the second end 56. In various embodiments of the invention, the first gap area plus the second gap area can be between about 1 $cm^2$ to about 1240 $cm^2$, or between about 1 $cm^2$ to about 180 $cm^2$, or between about 5 $cm^2$ to about 160 $cm^2$, or between about 5 $cm^2$ to about 100 $cm^2$, or between about 30 $cm^2$ to about 95 $cm^2$, or between about 75 $cm^2$ to about 90 $cm^2$, or between about 5 $cm^2$ to about 800 $cm^2$, or between about 5 $cm^2$ to about 600 $cm^2$, or between about 75 $cm^2$ to about 400 $cm^2$.

The sleeve 52 is constructed from a porous or air permeable material. The porous material can have a relatively open fibrous construction suitable for diffusing the incoming airflow. In general, the porous material forming the sleeve 52 will have a more open construction than the second filter layer 26. Suitable porous materials include, for example, nonwovens such as spunbond, melt blown, carded, and extruded monofilament materials; woven materials; sintered metals; scrim materials; foams such as open cell foams and closed cell foams; and screen or netting materials of metals or plastics. The materials can be electrostatically charged or employ additives such as an adhesive to enhance the collection of dust particles. Multiple sleeve materials can be combined to provide two or more layers for the sleeve sidewall 53. For example, a more porous material such as a screen material and a less porous material such as a spunbond material can be layered to create the sleeve sidewall 53.

The sleeve sidewall 53 can be made of a single ply or multiple plies placed in a face to face relationship. Depending on the uniformity of the manufacturing process, it may be desirable to stack multiple plies to create the sleeve sidewall 53 rather than form one individual thicker layer. The sleeve sidewall 53 can have a total basis weight ranging between about 10 to about 400 grams/m$^2$, or between about 30 to 350 grams/m$^2$, or between about 40 to about 250 grams/m$^2$ when used as a diffuser in the dust collection device 16. Generally, the sleeve sidewall has a combined total pressure drop of between about 0.05 mm H$_2$O to about 5.0 mm H$_2$O, or between about 0.10 to about 2.0 mm H$_2$O, or between about 0.15 to about 0.8 mm H$_2$O at 85 liters/minute air flow as tested by the Pressure Drop Measurement test method.

The total thickness of the sleeve sidewall 53 under a pressure of 0.05 psi with a 3.5 inch diameter platen (ASTM D5736-95 reapproved 2001) is desirably greater than about 1.0 mm, or between about 1.0 to about 10 mm, or between about 1.0 to about 15 mm. In general, sufficient thickness and basis weight should be provided to trap the larger dust and debris within the structure of the sleeve sidewall. If the material is pleated, the material prior to pleating is tested for the thickness.

The sleeve's cross section can have a shape that includes, for example, a round, an oval, a star, a triangle, or an oblong geometry forming a generally hollow tube shape. The sleeve can also taper either from the first end 54 to the second end 56 or from the second end 56 to the first end 54. The taper can be combined with any cross sectional shape to have a sleeve, for example, which is cone shaped. The sidewall 51 can be formed by one or more pieces that are seamed together. In one embodiment, the sleeve is formed from a single piece of nonwoven material that is folded approximately in half and then seamed longitudinally down a first edge 62 opposite a folded edge 64.

In addition to a gap at the first end 54 and/or the second end 56 of the sleeve 52, the inventors have discovered that an area ratio of the sleeve's surface area to the bag's surface area can affect the dust collection efficiency of the dust collection device 16. A bypass volume 66 should be present between an outer surface 68 of the sleeve 51 and an inner surface 70 of the composite sidewall material 29. The bypass volume 66 is the amount of volume present between the outer surface 68 of the sleeve and the inner surface 70 of the composite sidewall. The bypass volume 66 is believed to allow for airflow along the length of the bag 17 between the outer surface 68 and the inner surface 70 enhancing the dust collection efficiency. If the sleeve 51 is made the same size as the first filter layer 24, it essentially becomes another layer of the composite sidewall material 29 and does not function as a flow control valve or as a diffuser resulting in reduced dust collection efficiency. Conversely, if the sleeve 52 is sized too small, then the amount of dust captured by the sleeve is relatively small before the majority of the incoming air passes through the gap bypassing the sleeve such that the dust collection efficiency is not greatly enhanced.

For a pleated material, it is possible to have the bypass volume 66 even when the tips of the pleats touch the inner surface 70 of the composite sidewall material 29 since there is still a bypass volume 66 present between the valleys of the pleats and the inner surface 70 of the composite sidewall. If the pleats are orientated longitudinally, this allows for airflow down the length of the bag 17 between the outer surface 68 and the inner surface 70 in the valleys of the pleats. The area of the bag, AB, through which the dusty air is filtered is approximately 2*LB*WB. The area of the bag, near the coupler is slightly concave as a result of the sealing to the coupler; however, the bag 17 is constructed from a rectangular piece of material that is folded in half. The area of the sleeve, AS, through which the dusty air is filtered is approximately 2*LS*WS. The sleeve, in one embodiment, assumes an oval shape; however, the sleeve is constructed from a rectangular piece of material that is folded in half then expanded to fit over the coupler. If the sleeve material is pleated, the area of the sleeve, AS, is based on the outer dimensions or overall dimensions of the sleeve rather than the total surface area of the pleated material forming the sleeve. In various embodiments of the invention, the Area Ratio AS/AB can be between about 0.1 to about 0.9, or between about 0.2 to about 0.8, or between about 0.3 to about 0.7, or between about 0.4 to about 0.6.

Test Methods

Pressure Drop Measurement

The pressure drop across a layer of the composite sidewall material 29 of the dust capture device 16 is determined using a TSI™ Model 8130 high-speed automated filter tester (commercially available from TSI Incorporated, St. Paul, Minn.) at a flow rate of 85 liters/min, which is a face velocity of 13.8 centimeters per second. A salt aerosol spray is used during the testing and a 2% salt solution is placed in the salt aerosol generator. The TSI™ Model 8130 is configured, calibrated, and operated according to the Operation and Service Manual provided with the tester to test the layer of material.

EXAMPLES

The following material abbreviations are used for Examples 1-65.

| ABBRE-VIATION | DESCRIPTION |
|---|---|
| AD1 | 12.7 cm (5") multi-hole coated abrasive disc, commercially available under the trade designation "Clean Sanding Disc 360L GRADE P220" from 3M Company; St. Paul, Minnesota. |
| AD3 | 12.7 cm (5") multi-hole coated abrasive disc, commercially available under the trade designation "Clean Sanding Disc 236U GRADE P100" from 3M Company; St. Paul, Minnesota. |
| AD4 | 12.7 cm (5") multi-hole coated abrasive disc, commercially available under the trade designation "Clean Sanding Disc 236U GRADE P220" from 3M Company; St. Paul, Minnesota. |
| AD5 | 12.7 cm (5 in) multi-hole coated abrasive disc, commercially available under the trade designation "Clean Sanding Disc 735U GRADE P80" from 3M Company; St. Paul, Minnesota. |
| FM1 | 1.6 oz./sq. yd.(54 gsm) polypropylene spun bond web, commercially available as "TYPAR" from Fiberweb, Washougal, Washington. |
| FM2 | A microfiber melt blown nonwoven web produced and charged according to the methods outlined in Example 1 of U.S. Pat. No. 6,923,182, with the difference that the melt blown web had a basis weight of 25 grams per square meter. The melt blown web was made using a die with uniform orifice diameters. The resin used was a polypropylene resin available from Total S.A. of Paris, France, under the designation 3960. The microfiber melt blown |

-continued

| ABBRE-VIATION | DESCRIPTION |
|---|---|
| | nonwoven web had a basis weight of approximately 25 grams/m², a solidity of approximately 8.4%, and an Effective Fiber Diameter of approximately 4.7 µm. |
| FM3 | A microfiber melt blown nonwoven web produced and charged, according to the methods outlined in Example 1 in U.S. Pat. No. 6,923,182, The melt blown web was made using a die with uniform orifice diameters. The resin used was a polypropylene resin available from Total S.A. of Paris, France, under the designation 3960. The microfiber melt blown nonwoven had a basis weight of approximately 35 grams/m², a solidity of approximately 8.4%, and an Effective Fiber Diameter of approximately 4.7 µm. |
| FM4 | Two plies of FM2 were used for this layer |
| FM5 | Two plies of FM3 were used for this layer |
| FM6 | 150 gsm polypropylene nonwoven electret fabric, commercially available under the trade designation "3M FILTRETE- G150" from 3M Company, St. Paul, MN. |
| FM7 | 200 gsm polypropylene nonwoven electret fabric, commercially available under the trade designation "3M FILTRETE- G200" from 3M Company, St. Paul, MN. |
| FM8 | 90 gsm polypropylene nonwoven electret fabric, commercially available under the trade designation "3M FILTRETE- G90" from 3M Company, St. Paul, MN. |
| FM9 | Polypropylene screen fabric, commercially available under the trade designation "NALTEX 37-4057" from Nalle Plastics, Austin TX. (not die cut) |
| FM10 | Carded polyester nonwoven fabric, commercially available under the trade designation "TN3475" from Precision Textiles, Totowa, New Jersey. |
| Bag 1 | Ingersoll Rand 10.2 cm × 25.4 cm (4 in × 10 in) paper bag, "PN 49973" as supplied for model 4152 random orbital sanders, Ingersoll Rand, Annandale, New Jersey. |
| Bag 2 | Hoover Vacuum Bag part no. 4010801Y, available from www.hoover.com, cut to 10.2 cm × 25.4 cm (4.6 in. × 12.2 in.). |
| Bag 3 | Cloth dust bag part number 50694 (3 × 10) available from Dynabrade Corporation, Clarence, New York. |
| Coupler | A coupler 38 as illustrated in FIG. 4 for attaching the bag 17 to the dust exit port of the sanding tool. |
| Adapter | An adapter 32 as illustrated in FIG. 3 for connecting the coupler to the dust exit port of the sanding tool. |
| B1 | 40 gsm basis weight nonwoven including a 10 gsm polypropylene scrim netting ultrasonically bonded to a polypropylene nonwoven electret media commercially available under the trade designation "3M Filtrete - GSU30NE" from 3M Company, St. Paul, MN. |
| B2 | 70 gsm basis weight nonwoven including a 10 gsm polypropylene scrim netting laminated to a polypropylene nonwoven electret media commercially available under the trade designation "3M Filtrete - GSB70NE" from 3M Company, St. Paul, MN. |
| B3 | A nonwoven polyester pad, commercially available under the trade designation "3M Carpet Bonnet Pad White" from 3M Company, St. Paul, MN die cut to a 5-inch (12.7-cm) diameter disc. |
| B4 | P50 White foam, 0.375" thick, commercially available from Illbruck Inc, Minneapolis, MN. |
| B5 | 3M Filtrete - GSU30NE from 3M Company, St. Paul, MN pleated to have 6 mm height pleats. |
| B6 | 3M Filtrete - GSU30NE from 3M Company, St. Paul, MN pleated to have 10 mm height pleats. |
| B7 | 3M Filtrete - GSB70NE from 3M Company, St. Paul, MN pleated to have 6 mm height pleats. |
| B8 | 3M Filtrete - GSU70NE from 3M Company, St. Paul, MN pleated to have 10 mm height pleats. |
| B9 | 40 GSB Filtrete layer with scrim netting on both sides laminated to a 30 gsm, 4.7 micron blown microfiber web pleated to a 12 mm pleat height. The 30 gsm, 4.7 micron web was made similar to FM2 except that the basis weight was 30 gsm. |
| B10 | A continuous filament web produced by the method described in U.S. Pat. No. 5,733,825. |
| B11 | Spun bond polypropylene scrim, with a basis weight of approximately 1.7 oz./sq. yd. (58 gsm) and thickness of 14 millimeters. Typar Super Scrim is commercially available from Fiberweb ™ Reemay, Inc. |
| B12 | B3 was sprayed coated with 3M Spray Supper Adhesive 77. The coat weight of the adhesive was approximately 60 gsm. |
| B13 | A pressure sensitive adhesive loaded staple fiber web available under the trade name "Easy Trap Duster" from 3M Company, St. Paul, MN. |
| B14 | A microfiber melt blown nonwoven web was produced and charged according to Example 3 in U.S. patent application Ser. No. 11/693,186 "Flat-fold Respirator With Monocomponent Filtration/Stiffening Monolayer" filed Mar. 29, 2007. The web has a basis weight of 150 gsm and effective fiber diameter of 15 µm. |
| B15 | A carded polyester nonwoven fabric, commercially available as "HLO212" from Precision Textiles, Totowa, New Jersey. |
| B16 | A carded polyester nonwoven fabric, commercially available as "HLO302" from Precision Textiles, Totowa, New Jersey. |
| B17 | A carded polyester nonwoven fabric, commercially available as "HLO702" from Precision Textiles, Totowa, New Jersey. |

Examples 1-6 and 8

Examples 1-6 and 8 were prepared in the following manner: Layers of material were placed in a face to face relationship in the order shown in Tables 1 and 2. The layers were then cut as a group, to 24"×4.5" (61 cm×11.5 cm) sections. The sections were then folded over to form envelopes with the inner support layer 22 positioned in the middle. The envelopes for Examples 1-8 were 12"×4.5" (30.5 cm×11.5 cm). The two long edges of each envelope were sealed using masking tape and staples to create an air-tight seam. The open end of the envelope was then taped to the dust exit port of the sanding tool and tested under Test Methods 1 and 2, with results shown in Tables 1 and 2.

Examples 7 and 9

Examples 7 and 9 were prepared similarly to Examples 1 and 8 respectively, except prior to folding over, the laminate was ultrasonically welded as described in Welding Process 1 at a location approximately in the center of the laminate. After Welding Process 1, a 1.25" (3.8 cm) diameter hole was die cut in the center of the weld to give a 2" (2 cm) ring of uniform sealed material with an 1.25" (3.8 cm) opening. The resulting sealed ring and the coupler where jointed using hot melt adhesive trade designation "Jet Melt Adhesive 3764-PG" from 3M Company, St. Paul, Minn. The bond was made using 10 pounds of force (44.5 N) for 5 seconds and allowed to cool to 25 degrees C. Once the coupler was bonded to the laminate, the layers were folded over to form envelopes similar to those of Examples 1 and 11, except that the two long edges and the short edge of the envelope were ultrasonically welded as described in Ultrasonic Welding Process 2.

Ultrasonic Welding Process 1:

A circular ring was welded into the laminate using a model "DUKANE 3000 AUTO TRAC 20 KHZ ULTRASONIC WELDER", obtained from Dukane Intelligent Assembly Solutions, St. Charles, Ill. Welding conditions were as follows:

| Horn: | 3" (7.6 cm) dia by 4.7" (12 cm) long Aluminum cylinder |
|---|---|
| Anvil | Steel disc 2" (5 cm) OD × 1.25" (3.2 cm) ID |
| Laminate | Orientated with Layer 4 contacting the Horn. |
| Booster: | 1:1.5 |
| | Weld Parameters: |
| Method: | Weld by Energy @ 3000 J |
| Pressure: | 90 psi (620 kPa) |
| Hold Time | .5 sec |
| Trigger Force | 100 lb (445 N) |
| Amplitude % | 100% |
| Time-out | 8 sec |

Ultrasonic Welding Process 2

A series of edge seals were welded into the laminate using a Branson 2000d power supply 20 kHz, 4 kW with a Branson 2000aed actuator with a 3 inch (7.6 cm) diameter cylinder, available from Branson Ultrasonics Corp., Danbury Conn. The following conditions were used:

| Horn: | Dukane 9.5" wide bar horn, carbide tip, labeled "#2" |
|---|---|
| Anvil | Fine knurl rail, 18" × 3 mm × 0.164" |
| Booster: | 1:1 |
| | Weld Parameter |
| Method: | Weld by Peak Power %, 32% |
| Pressure: | 70 psi (483 kPa) |
| Hold Time | .2 sec |
| Trigger Force | 75 lb (334 N) |
| Amplitude % | 100% |
| Time-out | 3 sec |

Making of Vacuum Bag 2

A Hoover vacuum cleaner bag, part number 4010801Y available from www.hoover.com, was cut down to the size of 4.6" (11.7 cm)×12.2" (31 cm). Three sides of bag were sealed with the help of Ultrasonic welding process. One 4.6" (11.7 cm) side was left open to connect to the end of sander for dust collection evaluation.

Making of the Paper Vacuum Bag 1

A standard paper vacuum bag part number 49973 from an Ingersoll Rand sanding kit was cut down to the size of 4.6" (11.7 cm)×12.2" (31 cm). Three sides of bag were sealed with the help of staples. One 4.6" (11.7 cm) side was left open to connect to the end of sander for dust collection evaluation.

Gel Coat Sanding Test Method 1

AD1 was attached to a 40-hole, 12.7-cm (5.0-inch) diameter by 0.95-cm (⅜-inch) thick foam back up pad, available under the trade designation "3M HOOKIT BACKUP PAD, #20206" from 3M Company. The backup pad and disc assembly was then mounted onto a 12.7-cm (5-inch) diameter, medium finishing, dual-action orbital sander, Model 050237, obtained from Air Vantage sander, El Monte, Calif. 91731. A pre-weighed dust collection device (11.43 cm×30.48 cm) was attached to the dust exit port of the sander. The abrasive face of the disc was manually brought into contact with a pre-weighed, 46 cm by 76 cm (18 inches by 30 inches) gel-coated fiberglass reinforced plastic panel, obtained from White Bear Boat Works, White Bear Lake, Minn. The sander was run at 620 kPa (90 psi) air line pressure and a down-force of 10 pounds force (44 N) for approximately 7 cycles of 150 seconds each. An angle of zero degrees to the surface of the workpiece was used. Each sanding cycle consisted of 48 overlapping transverse passes, for a combined 1008 inches (25.16 meters) total path length, at a tool speed of 17 cm per second (6.7 inches per second) across the panel surface resulting in an evenly sanded area of the test panel.

After the first sanding cycle, the test panel was cleaned by blowing compressed air across the top of the sanded panel to remove visible dust. The dust bag was removed from the sander and both the panel and the dust bag were weighed. The Dust Collection Efficiency was calculated by dividing the total weight of the sanded test panel and the dust bag by the combined initial weight of the test panel and the dust bag prior to sanding and multiplying by 100. The same dust bag was remounted on the dust exit port of the sander and the 150-second sanding cycle was repeated using the same test panel. The test panel was again cleaned by blowing compressed air across the top of the sanded panel to remove visible dust. The dust bag was removed from the sander a second time and both the test panel and the dust bag were weighed. The Dust Collection Efficiency after the second sanding was calculated by dividing the total weight of the sanded test panel and the dust bag by the combined initial weight of the test panel and the dust bag prior to sanding and multiplying by 100. Testing was continued as described above for each 150-second sanding cycle until the calculated dust collection efficiency fell below 70%.

The following measurements were made for each sample tested by this method and reported as an average of two test samples per Example in Table 1:

"Cut": Weight, in grams, removed from the plastic panel;

"Retain": weight, in grams, of particles collected in the sample bag; and

"Time-minutes at 70%": Time needed to reach 70% dust collection efficiency.

"Dust Collection Efficiency" is the ratio of the Retain/Cut multiplied by 100.

TABLE 1

Gel Coat Sanding

| Example | Outer Support Layer (28) | Second Filter Layer (26) | First Filter Layer (24) | Inner Support Layer (22) | Time-minutes at 70% Efficiency |
|---|---|---|---|---|---|
| 1 | FM1 | FM4 | FM6 | FM9 | 24.0 |
| 2 | FM1 | FM3 | FM6 | none | 17.5 |
| 3 | FM1 | FM5 | FM7 | none | 16.0 |
| 4 | FM1 | FM3 | FM7 | none | 17.5 |
| 5 | FM1 | FM3 | FM8 | none | 12.5 |
| 6 | FM1 | FM2 | FM6 | none | 13.8 |
| 7 | FM1 | FM4 | FM6 | FM9 | 22.0 |
| Bag 1 | | | | | 8.0 |

TABLE 1-continued

Gel Coat Sanding

| Example | Outer Support Layer (28) | Second Filter Layer (26) | First Filter Layer (24) | Inner Support Layer (22) | Time-minutes at 70% Efficiency |
|---|---|---|---|---|---|
| Bag 2 | | | | | 7.5 |
| Bag 3 | | | | | 2.5 |

*Example 7 was prepared with Ultrasonic welding process and the coupler was glued to bag with hot melt adhesive. Examples 1 & 7 have same internal construction and same size.

Figure 5:
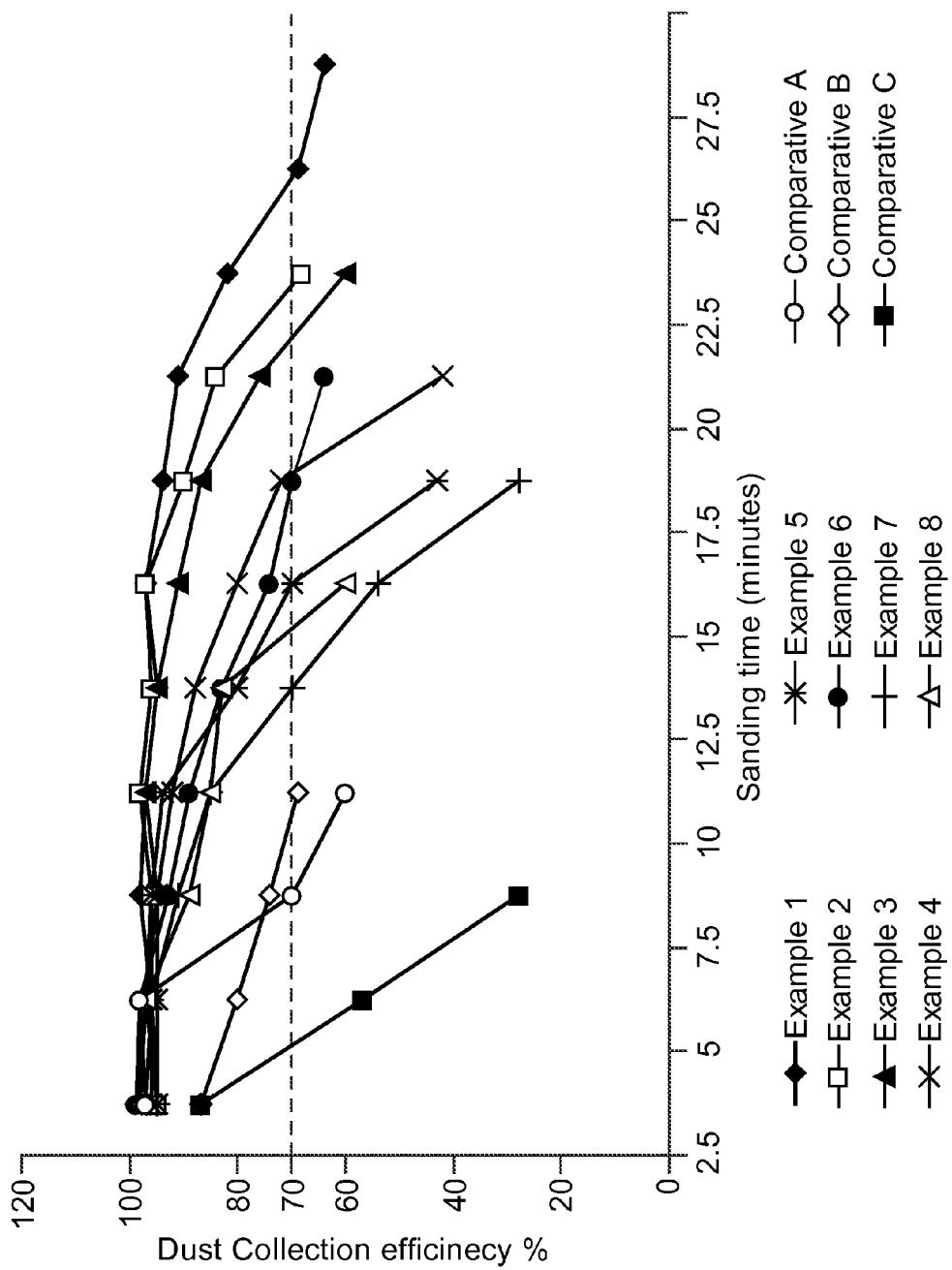
FIG. 5 illustrates a graph of Dust Collection Efficiency versus Time for the dust collection device and several commercially available dust collection bags for sanding tools.

FIG. 5 plots the results of the Gel Coat Sanding Test Method 1 after each sanding interval. A horizontal line is drawn for reference at the 70% dust collection efficiency level. Some of the Examples were tested for a longer period of time despite the fact that the Dust Collection Efficiency had dropped below 70%. As seen, the dust collection devices in Examples 1-7 having a first and a second filter layer (24, 26) had greatly improved performance over the comparative examples Bag 1, Bag 2, and Bag 3.

Hard Maple Wood Sanding Test Method 2

AD3 was attached to a 40-hole, 12.7-cm (5.0-inch) diameter by 0.95-cm (⅜-inch) thick foam back up pad, available under the trade designation "3M HOOKIT BACKUP PAD, #20206" from 3M Company. The backup pad and disc assembly were then mounted onto a 12.7-cm (5-inch) diameter, medium finishing, dual-action orbital sander, Model 050237, obtained from Air Vantage sander, El Monte, Calif. 91731. A pre-weighed dust collection device (11.43 cm×15.24 cm) was attached to the dust exit port of the sander. The abrasive face of the disc was manually brought into contact with a pre-weighed, 40.6 cm by 40.6 cm (16 inches by 16 inches) hard maple wood, obtained from Woodcrafts Industrial, St. Cloud, Minn. The sander was run at 620 kPa (90 psi) air line pressure and a down-force of 10 pounds force (44 N) for 7 cycles of 150 seconds each. An angle of zero degrees to the surface of the workpiece was used. Each cycle consisted of 48 overlapping transverse passes, for a combined 1008 inches (25.16 meters) total path length, at a tool speed of 17 cm per second (6.7 inches per second) across the panel surface resulting in an evenly sanded area of test panel.

After the first sanding cycle, the test panel was cleaned by blowing compressed air across the top of the sanded panel to remove visible dust. The dust bag was removed from the sander and both the panel and the dust bag were weighed. The Dust Collection Efficiency was calculated by dividing the total weight of the sanded test panel and the dust bag by the combined initial weight of the test panel and the dust bag prior to sanding and multiplying by 100. The same dust bag was remounted on the dust exit port of the sander and the 150-second sanding cycle was repeated using the same test panel. The test panel was again cleaned by blowing compressed air across the top of the sanded panel to remove visible dust. The dust bag was removed from the sander a second time and both the test panel and the dust bag were weighed. The Dust Collection Efficiency after the second sanding was calculated by dividing the total weight of the sanded test panel and the dust bag by the combined initial weight of the test panel and the dust bag prior to sanding and multiplying by 100. Testing was continued as described above for each 150-second sanding cycle until the calculated dust collection efficiency fell below 70%.

The following measurements were made for each sample tested by this method and reported as an average of two test samples per Example in Table 1 as indicated:

"Cut": Weight, in grams, removed from the plastic panel;

"Retain": weight, in grams, of particles collected in the sample bag; and

"Time-minute at 70%": Time needed to reach 70% dust collection efficiency.

"Dust Collection Efficiency" is the ratio of the Retain/Cut multiplied by 100.

TABLE 2

Wood Sanding

| Example | 1$^{st}$ layer (cover) | 2$^{nd}$ layer | 3$^{rd}$ layer | 4$^{th}$ layer (inside) | Time-minutes at 70% Efficiency | Comments |
|---|---|---|---|---|---|---|
| 8 | FM1 | FM4 | FM6 | FM9 | 56 | No dust leak-FM4 |
| 9 | FM1 | FM4 | FM6 | FM9 | 70 | No dust leak-FM4 |
| Bag 3 | | | | | 10 | No dust leak-cloth |

*No dust leak: Dust was not observed on the bag's outer surface.
*Example 9 was prepared with Ultrasonic welding process and the coupler was glued to bag with hot melt adhesive. Example 8 & Example 9 have same internal construction with same size.

Horizontal to Vertical Sanding Test Method 3

A 5.0-inch (12.7-cm) diameter P220 236L (AD4) multi-hole abrasive disc (Clean Sanding Disc) was attached to a 40-hole, 5.0-inch (12.7-cm) diameter by ⅜-inch (0.95-cm) thick foam back up pad, available under the trade designation "3M HOOKIT BACKUP PAD, #21033" from 3M Company. The backup pad and disc assembly was then mounted onto a 5-inch (12.7-cm) diameter, medium finishing, dual-action orbital sander, model 21038, obtained from Dynabrade Corporation., Clarence, N.Y. The sander was run horizontally at 90 psi (620 kPa) air line pressure for 3 cycles of 60 seconds each. The workpiece was an automotive panel with DuPont 1140S primer coating. An angle of zero degrees to the surface of the workpiece was used. After the first cycle, the test panel was cleaned by blowing compressed air across the top of the sanded panel to remove visible dust. The disc was removed from the back up pad and both the test panel and disc were weighed. Similarly, the bag was also removed from the sander and weighed. The abrasive disk was remounted on the back up pad and the bag was reattached to the sander. The 2nd horizontal sanding cycle was conducted using the same test panel. The test panel was again cleaned by blowing compressed air across the top of the sanded panel to remove visible dust. The abrasive disc was removed from the back up pad and both the test panel and abrasive disc were weighed. Once again, the bag was removed from sander and weighed. The abrasive disk was remounted on the back up pad and the bag was reattached to the sander. After the 2$^{nd}$ sanding cycle, the tested panel was placed vertically against the wall and the 3$^{rd}$ (now vertical) sanding application was applied to the same test panel with the dust bag aligned vertically and the dust inlet to the bag positioned beneath the body of the bag. The test panel was again cleaned by blowing compressed air across the top of the sanded panel to remove visible dust. The abrasive disc was removed from the back up pad and both the panel and abrasive disc were weighed. Once again, the bag was removed from sander and weighed.

The following measurements were made for each Example tested by this method and reported as an average of two test samples per Example in Table 3 as indicated:

"Cut": weight, in grams, removed from the plastic panel;
"Retain": weight, in grams, of particles collected in the sample bag
"DE %-bag": ratio of the Retain/Cut multiplied by 100 in sample bag.

TABLE 3

Horizontal to Vertical Sanding

| Example | Cut 1 (Hor.) | DE % 1 | Cut 2 (Hor.) | DE % 2 | Cut 3 (Ver.) | DE % 3 | Comments |
|---|---|---|---|---|---|---|---|
| Bag 1 | 20.1 | 92 | 23.09 | 92 | 9.13 | 49 | Very dusty, a lot of dust came out of bag. |
| Bag 2 | 22.61 | 86 | 23.16 | 29 | NA | NA | Dust appeared at end of 1st cut-bag may be full. Poor dust collection was found at 2nd cut. Vertical cut was not tried. |
| Bag 3 with larger bag (7 in × 9 in) | 22.73 | 91 | 24.32 | 71 | 9.55 | 74 | Some dust escaped at end of 1st cut. Dust observed in air and on the panel at 2nd cut. Very dusty and lots of dust dropping at vertical cut. |
| Example 1 | 24.77 | 95 | 23.37 | 86 | 9.22 | 85 | Light dust was observed at end of 2nd cut. Some dust was observed at vertical cut. No dropping at vertical cut. |

As seen in Table 3, Example 1 achieved 85% dust collection efficiency when sanding vertically, which was significantly greater than the comparative examples.

Life Testing of Pressure Fit Between the Adapter and the Coupler

The life of the adapter 32 was tested by cycling the coupler 38 to the adapter up to 500 times and measuring the Air Tightness and Pull Force in 1 bf of the friction fit. The pull force test method used was the TestWorks MTS Simplified Tensile Test and ASTM standards mechanical properties testing.

TABLE 4

Results of Adapter to Coupler testing

| Cycles or Uses | Air Tightness | Pull Force to removed from IN1 | Comments |
|---|---|---|---|
| 0 | Excellent | 47.2 lbf (210 N) | Very good seal |
| 50 | Excellent | 17.33 lbf (77 N) | Held well |
| 500 | Excellent | 14.4 lbf (64 N) | Friction Fit held well |

The results show that after 500 uses, the friction fit of the adapter to the coupler remains in tact and strong enough to make the product functional.

Examples 10-65

Examples 10-65 were prepared in a similar manner as done for Examples 7 and 9 except that Ultrasonic Weld Process 2 was not used and the seam 30 was made by stapling the edges together and sealing with tape similar to Example 1. For Examples 10, 18, 22, 47, 58, 59, and 64 where the sleeve 52 was not used, the size of the starting materials was adjusted as required to result in the bag 17 having the size specified in Tables 5, 6 and 7. For the remaining Examples, the sleeve 52 was inserted over the ribbed second end 44 of the coupler 38 prior to sealing the bag 17 forming the seam 30. The sleeve 52 was formed by cutting the specified material to the appropriate starting size, folding the material longitudinally to form the sleeve with the size specified in Tables 5, 6, and 7, and then stapling the longitudinal edges to seal the first edge 62 opposite the folded edge 64. A series of staples along the length of the sleeve was used to minimize any air leakage. In some of the Examples, either the first end 54 or the second end 56, or both ends of the sleeve were sealed to eliminate either the first gap 58, or the second gap 60, or both gaps. The first end 54 was sealed to the coupler 38 by tape to eliminate the first gap 58. The second end 56 was sealed by a series of staples along the second end to eliminate the second gap 60. Examples 10-21 and Examples 59-65 were tested according to Gel Coat Sanding Test Method 1 as previously described, except that AD5 was the abrasive article used for the test. Examples 22-58 were tested according to Hard Maple Wood Sanding Test Method 2 as previously described. The results of the testing are presented in Tables 5, 6, and 7.

TABLE 5

Gel Coat Sanding Test Results

| Example | Outer Support Layer | Second Filter Layer | First Filter Layer | Inner Support Layer | Center Sleeve Material | Area Sleeve sq cm (WS × LS) | Area Bag sq cm (WB × LB) | Area Ratio AS/BS | Cut Rate g/min | Result-Minutes >70% Efficiency | Comments |
|---|---|---|---|---|---|---|---|---|---|---|---|
| 10 | FM1 | FM4 | FM6 | FM9 | None | none | 452 (5" × 7") | none | 4.8 | 7.5 | No sleeve |
| 11 | FM1 | FM4 | FM6 | none | B1 | 213 (3" × 5.5") | 452 (5" × 7") | 0.47 | 4.8 | 11 | Gaps 1$^{st}$ & 2$^{nd}$ end |
| 12 | FM1 | FM4 | FM6 | none | B6 | 213 (3" × 5.5") | 452 (5" × 7") | 0.47 | 4.8 | 12 | Gaps 1$^{st}$ & 2$^{nd}$ end |
| 13 | FM1 | FM4 | FM6 | none | B6 | 348 (4.9" × 5.5") | 452 (5" × 7") | 0.77 | 4.8 | 12.5 | Gaps 1$^{st}$ & 2$^{nd}$ end |
| 14 | FM1 | FM4 | FM6 | none | B5 | 213 (3" × 5.5") | 452 (5" × 7") | 0.47 | 4.8 | 12.5 | Gaps 1$^{st}$ & 2$^{nd}$ end |
| 15 | FM1 | FM4 | FM6 | none | B4 | 213 (3" × 5.5") | 452 (5" × 7") | 0.47 | 4.8 | 14 | Gaps 1$^{st}$ & 2$^{nd}$ end |
| 16 | FM1 | FM4 | FM6 | none | B9 | 213 (3" × 5.5") | 452 (5" × 7") | 0.47 | 4.8 | 14 | Gaps 1$^{st}$ & 2$^{nd}$ end |
| 17 | FM1 | FM4 | FM6 | none | B3 | 213 (3" × 5.5") | 452 (5" × 7") | 0.47 | 4.8 | 12.5 | Gaps 1$^{st}$ & 2$^{nd}$ end |
| 18 | FM1 | FM4 | FM6 | none | None | none | 735 (5" × 11.5") | none | 4.8 | 12.5 | No sleeve |
| 19 | FM1 | FM4 | FM6 | none | B4 | 345 (3" × 9") | 741 (5" × 11.5") | 0.47 | 4.8 | 31 | Gaps 1$^{st}$ & 2$^{nd}$ end |
| 20 | FM1 | FM4 | FM6 | none | B10 | 345 (3" × 9") | 741 (5" × 11.5") | 0.47 | 4.8 | 27 | Gaps 1$^{st}$ & 2$^{nd}$ end |
| 21 | FM1 | FM4 | FM6 | none | B9 | 345 (3" × 9") | 741 (5" × 11.5") | 0.47 | 4.8 | 45 | Gaps 1$^{st}$ & 2$^{nd}$ end |

TABLE 6

Wood Sanding Test Results

| Example | Outer Support Layer | Second Filter Layer | First Filter Layer | Inner Support Layer | Center Sleeve Material | Area Sleeve sq cm (WS × LS) | Area Bag sq cm (WB × LB) | Area Ratio AS/BS | Cut Rate g/min | Result-Minutes >70% Efficiency | Comments |
|---|---|---|---|---|---|---|---|---|---|---|---|
| 22 | FM1 | FM4 | FM6 | FM9 | None | none | 452 (5" × 7") | none | 3.4 | 15 | No sleeve |
| 23 | FM1 | FM4 | FM6 | none | B1 | 114 (1.6" × 5.5") | 452 (5" × 7") | 0.25 | 3.4 | 15 | Gaps 1$^{st}$ & 2$^{nd}$ end |
| 24 | FM1 | FM4 | FM6 | none | B1 | 213 (3" × 5.5") | 452 (5" × 7") | 0.47 | 3.4 | 35 | Gaps 1$^{st}$ & 2$^{nd}$ end |
| 25 | FM1 | FM4 | FM6 | none | B1 | 354 (5" × 5.5") | 452 (5" × 7") | 0.79 | 3.4 | 20 | Gaps 1$^{st}$ & 2$^{nd}$ end |
| 26 | FM1 | FM4 | FM6 | none | B6 | 213 (3" × 5.5") | 452 (5" × 7") | 0.47 | 3.4 | 30 | Gaps 1$^{st}$ & 2$^{nd}$ end |
| 27 | FM1 | FM4 | FM6 | none | B2 | 213 (3" × 5.5") | 452 (5" × 7") | 0.47 | 3.4 | 20 | Gaps 1$^{st}$ & 2$^{nd}$ end |
| 28 | FM1 | FM4 | FM6 | none | B8 | 213 (3" × 5.5") | 452 (5" × 7") | 0.47 | 3.4 | 25 | Gaps 1$^{st}$ & 2$^{nd}$ end |
| 29 | FM1 | FM4 | FM6 | none | B7 | 213 (3" × 5.5") | 452 (5" × 7") | 0.47 | 3.4 | 22.5 | Gaps 1$^{st}$ & 2$^{nd}$ end |
| 30 | FM1 | FM4 | FM6 | none | B4 | 213 (3" × 5.5") | 452 (5" × 7") | 0.47 | 3.4 | 35 | Gaps 1$^{st}$ & 2$^{nd}$ end |
| 31 | FM1 | FM4 | FM6 | none | B3 | 213 (3" × 5.5") | 452 (5" × 7") | 0.47 | 3.4 | 31 | Gaps 1$^{st}$ & 2$^{nd}$ end |
| 32 | FM1 | FM4 | FM6 | none | B11 | 213 (3" × 5.5") | 452 (5" × 7") | 0.47 | 3.4 | 22.5 | Gaps 1$^{st}$ & 2$^{nd}$ end |
| 33 | FM1 | FM4 | FM6 | none | B10 | 213 (3" × 5.5") | 452 (5" × 7") | 0.47 | 3.4 | 22.5 | Gaps 1$^{st}$ & 2$^{nd}$ end |
| 34 | FM1 | FM4 | FM6 | none | B9 | 213 (3" × 5.5") | 452 (5" × 7") | 0.47 | 3.4 | 27.5 | Gaps 1$^{st}$ & 2$^{nd}$ end |
| 35 | FM1 | FM4 | FM6 | none | B3 | 213 (3" × 5.5") | 452 (5" × 7") | 0.47 | 3.4 | 32.5 | Gaps 1$^{st}$ & 2$^{nd}$ end |
| 36 | FM1 | FM4 | FM6 | none | B12 | 213 (3" × 5.5") | 452 (5" × 7") | 0.47 | 3.4 | 39 | Gaps 1$^{st}$ & 2$^{nd}$ end |
| 37 | FM1 | FM4 | FM6 | none | B13 | 213 (3" × 5.5") | 452 (5" × 7") | 0.47 | 3.4 | 34 | Gaps 1$^{st}$ & 2$^{nd}$ end |
| 38 | FM1 | FM4 | FM6 | none | B14 | 213 (3" × 5.5") | 452 (5" × 7") | 0.47 | 3.4 | 24 | Gaps 1$^{st}$ & 2$^{nd}$ end |

TABLE 6-continued

Wood Sanding Test Results

| Example | Outer Support Layer | Second Filter Layer | First Filter Layer | Inner Support Layer | Center Sleeve Material | Area Sleeve sq cm (WS × LS) | Area Bag sq cm (WB × LB) | Area Ratio AS/BS | Cut Rate g/min | Result-Minutes >70% Efficiency | Comments |
|---|---|---|---|---|---|---|---|---|---|---|---|
| 39 | FM1 | FM4 | FM6 | none | B3 | 213 (3" × 5.5") | 452 (5" × 7") | 0.47 | 3.4 | 16 | Sealed 1st & 2nd end |
| 40 | FM1 | FM4 | FM6 | none | B3 | 213 (3" × 5.5") | 452 (5" × 7") | 0.47 | 3.4 | 30 | Sealed at 2nd end |
| 41 | FM1 | FM4 | FM6 | none | B3 | 213 (3" × 5.5") | 452 (5" × 7") | 0.47 | 3.4 | 24 | Sealed at 1st end |
| 42 | FM1 | FM4 | FM6 | none | B3 | 194 (3" × 5") | 452 (5" × 7") | 0.43 | 3.4 | 27.5 | Sealed at 1st end |
| 43 | FM1 | FM4 | FM6 | none | B3 | 174 (3" × 4.5") | 452 (5" × 7") | 0.39 | 3.4 | 30 | Sealed at 1st end |
| 44 | FM1 | FM4 | FM6 | none | B3 | 155 (3" × 4") | 452 (5" × 7") | 0.34 | 3.4 | 27.5 | Sealed at 1st end |
| 45 | FM1 | FM4 | FM6 | none | B3 | 116 (3" × 3") | 452 (5" × 7") | 0.26 | 3.4 | 22 | Sealed at 1st end |
| 46 | FM1 | FM4 | FM6 | none | B3 | 77 (3" × 2") | 452 (5" × 7") | 0.17 | 3.4 | 18 | Sealed at 1st end |
| 47 | FM1 | FM4 | FM6 | FM9 | None | None | 452 (5" × 7") | none | 3.4 | 16 | No sleeve |
| 48 | FM1 | FM4 | FM6 | none | B3 | 156 (2.2" × 5.5") | 632 (7" × 7") | 0.25 | 3.4 | 20 | Gaps 1st & 2nd end |
| 49 | FM1 | FM4 | FM6 | none | B3 | 298 (4.2" × 5.5") | 632 (7" × 7") | 0.47 | 3.4 | 45 | Gaps 1st & 2nd end |
| 50 | FM1 | FM4 | FM6 | none | B3 | 425 (6" × 5.5") | 632 (7" × 7") | 0.67 | 3.4 | 44.5 | Gaps 1st & 2nd end |
| 51 | FM1 | FM4 | FM6 | none | B3 | 213 (3" × 5.5") | 452 (5" × 7") | 0.47 | 3.4 | 31 | Gaps 1st & 2nd end |
| 52 | FM1 | FM4 | FM6 | none | B3 | 241 (3.4" × 5.5") | 541 (7" × 7") | 0.38 | 3.4 | 38 | Gaps 1st & 2nd end |
| 53 | FM1 | FM4 | FM6 | none | B3 | 283 (4" × 5.5") | 613 (6.8" × 7") | 0.46 | 3.4 | 53 | Gaps 1st & 2nd end |
| 54 | FM1 | none | none | none | B9 | 213 (3" × 5.5") | 452 (5" × 7") | 0.47 | 2.5 | 46 | Dust leak |
| 55 | FM1 | FM4 | none | none | B9 | 213 (3" × 5.5") | 452 (5" × 7") | 0.47 | 2.5 | 36 | No leak |
| 56 | FM1 | FM4 | B9 | none | FM6 | 213 (3" × 5.5") | 452 (5" × 7") | 0.47 | 2.5 | 15 | No leak |
| 57 | FM1 | FM4 | FM6 | none | B9 | 213 (3" × 5.5") | 452 (5" × 7") | 0.47 | 2.5 | 45 | No leak |
| 58 | FM1 | FM4 | FM6 | FM9 | none | none | 452 (5" × 7") | none | 2.5 | 10 | No Sleeve |

TABLE 7

Gel Coat Sanding Test

| Example | Outer Support Layer | Second Filter Layer | First Filter Layer | Inner Support Layer | Center Sleeve Material | Area Sleeve sq cm (WS × LS) | Area Bag sq cm (WB × LB) | Area Ratio AS/BS | Cut Rate g/min | Result-Minutes >70% Efficiency | Comments |
|---|---|---|---|---|---|---|---|---|---|---|---|
| 59 | FM1 | FM2 | FM6 | FM9 | none | none | 773 (5" × 12") | None | 8 | 12.5 | Control |
| 60 | FM1 | FM2 | FM10 | FM9 | FM10 | 439 (4.0" × 8.5") | 773 (5" × 12") | 0.56 | 8 | 25 | Gaps at both ends |
| 61 | FM1 | FM2 | FM10 | FM9 | FM10/B15 | 439 (4.0" × 8.5") | 773 (5" × 12") | 0.56 | 8 | 27 | Gaps at both ends |
| 62 | FM1 | FM2 | FM10 | FM9 | FM10/B16/B15 | 439 (4.0" × 8.5") | 773 (5" × 12") | 0.56 | 8 | 31 | Gaps at both ends |
| 63 | FM1 | FM2 | FM10 | FM9 | B17 | 439 (4.0" × 8.5") | 773 (5" × 12") | 0.56 | 8 | 37.5 | Gaps at both ends |
| 64 | FM1 | FM4 | FM6 | FM9 | none | none | 773 (5" × 12") | none | 8 | 12 | Control/ standard |
| 65 | FM1 | FM4 | FM6 | FM9 | FM10/B16/B15 | 439 (4.0" × 8.5") | 773 (5" × 12") | 0.56 | 8 | 25 | Gaps at both ends |

The pressure drop of the sleeve materials for Examples 10-65 were tested in accordance with the Pressure Drop Measurement Test. The thickness of the sleeve materials were tested according to ASTM D5736-95. Pleated materials were tested prior to pleating as flat samples. Results of the testing are present in Table 8.

TABLE 8

Pressure Drop/Thickness Measurements

| Materials | Pressure Drop (mm H₂O) | Thickness (mm) | Comment |
|---|---|---|---|
| B1 | 0.33 | 1.4 | |
| B2 | 0.65 | 2.2 | |
| B3 | 0.47 | 7.2 | |
| B4 | 0.24 | 9.5 | |
| B5 | 0.34 | 1.4 | measured flat pre-pleating |
| B6 | 0.34 | 1.4 | measured flat pre-pleating |
| B7 | 0.66 | 2.2 | measured flat pre-pleating |
| B8 | 0.66 | 2.2 | measured flat pre-pleating |
| B9 | 3.50 | 1.9 | measured flat pre-pleating |
| B10 | 0.06 | 6.0 | |
| B11 | 0.09 | 3.5 | |
| B12 | 0.47 | 7.3 | |
| B13 | 0.19 | 7.8 | 3 plies |
| B14 | 3.23 | 1.7 | |
| B15 | 0.1 | 2.9 | |
| B16 | 0.19 | 7.4 | |
| B17 | 0.42 | 13.4 | |

Figure 8:
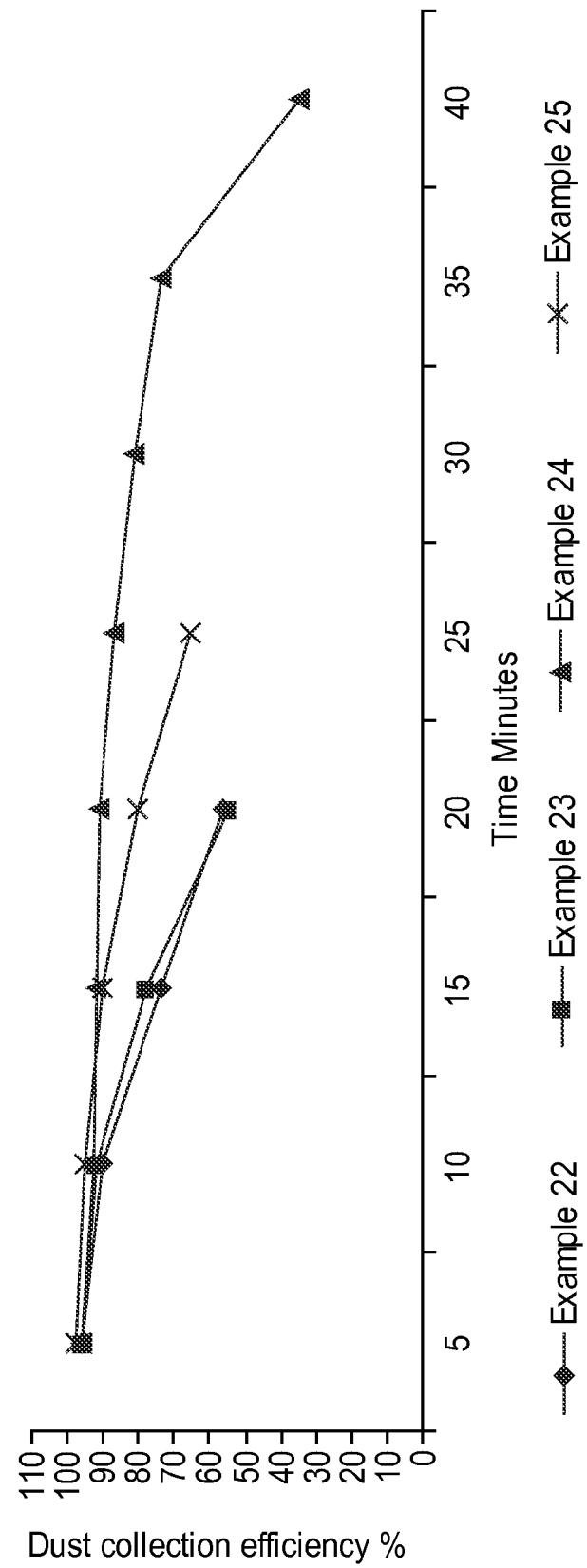
FIG. 8 illustrates a graph of Dust Collection Efficiency versus Time for the dust collection device having a sleeve with different area ratios.

Referring now to FIG. 8 selected results are plotted for Dust Collection Efficiency versus Time. FIG. 8 represents changes in the Area Ratio AS/AB. Example 22 does not have a sleeve, Example 23 has a 0.25 Area Ratio, Example 24 has a 0.47 Area Ratio, and Example 25 has a 0.79 Area Ratio. As seen, Examples 24 and 25 performed significantly better than the control with an Area Ratio of 0.47 performing best.

Figure 9:
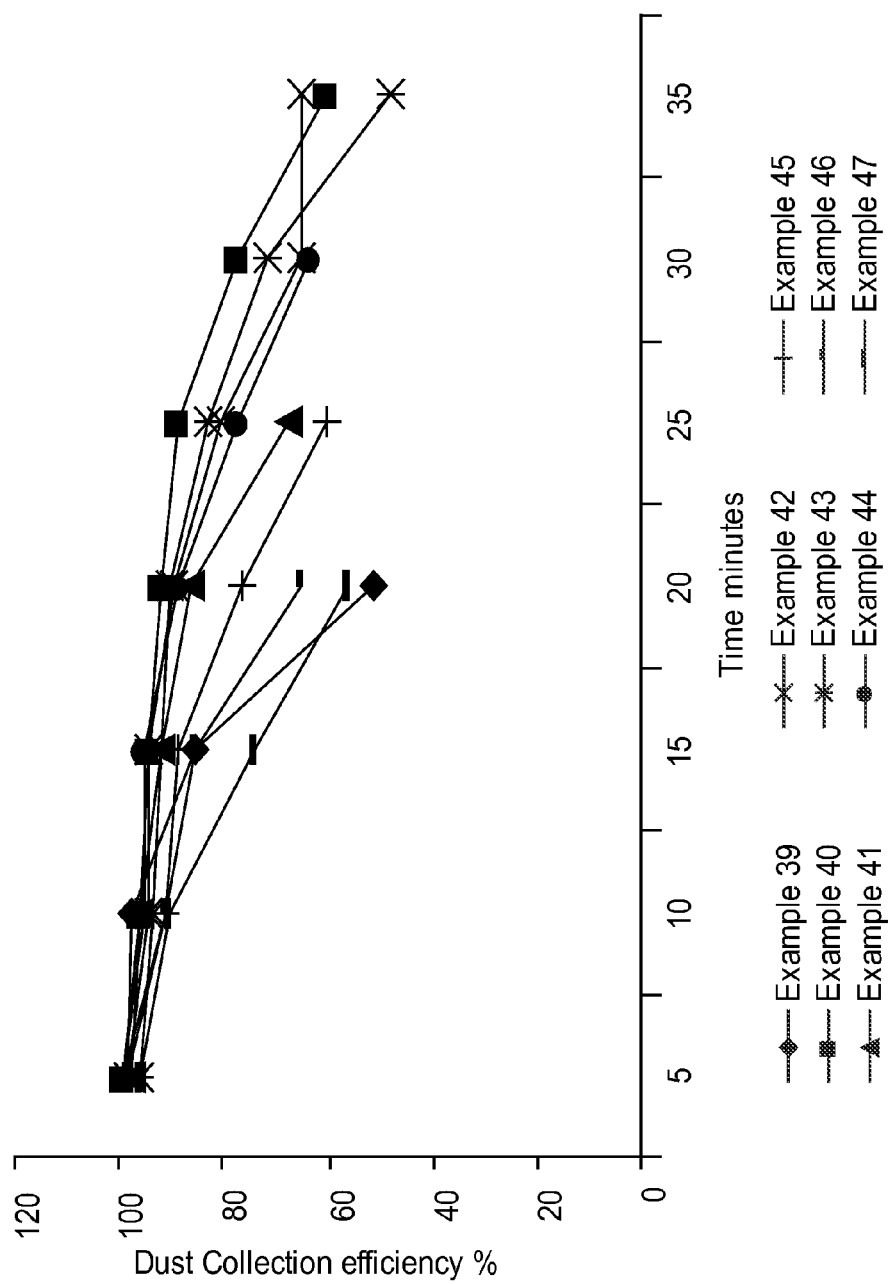
FIG. 9 illustrates a graph of Dust Collection Efficiency versus Time for the dust collection device having a sleeve with different gaps.

Referring now to FIG. 9 selected results are plotted for Dust Collection Efficiency versus Time. FIG. 9 represents changes in sleeve length. Example 39 has a sleeve sealed at both ends (bag within a bag) and Example 47 has no sleeve. Both had a 70% efficiency rating of only 16 minutes. Example 40 with LS=5.5 inch had a 70% efficiency rating of 30 minutes, which is nearly twice the sanding time of Example 47 without a sleeve. In general, as the length of the sleeve is reduced decreasing the Area Ratio the efficiency decreased. Example 46 with LS=2.0 inch had a 70% efficiency rating of 18 minutes.

Other modifications and variations to the present invention may be practiced by those of ordinary skill in the art, without departing from the spirit and scope of the present invention, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in a consistent manner. In the event of inconsistencies or contradictions between the incorporated references and this application, the information in the preceding description shall control. The preceding description in order to enable one of ordinary skill in the art to practice the claimed invention is not to be construed as limiting the scope of the invention, which is defined by the claims and all equivalents thereto.

What is claimed is:

1. A product comprising:
a dust collection device for a sanding tool comprising a bag having a sidewall with an inner surface and a coupler attached to the bag;
the sidewall comprising at least one filter layer and an outer support layer;
a sleeve having an outer surface, a sleeve sidewall with an inner surface, a first open end, a second open end, a first gap having a first gap area with an air flow path located at the first open end between the sleeve first open end and both the coupler and the inner surface of the bag and a second gap having a second gap area with an air flow path located at the second open end between the sleeve second open end and the inner surface of the bag; the sleeve constructed from a porous air permeable material; and
the first open end positioned surrounding the coupler to direct incoming air through the sleeve and the sleeve apportioning more airflow through the first gap and the second gap as the permeability of the sleeve is reduced, and the sleeve is sized and positioned within the bag such that an air flow bypass volume is present between the outer surface and the inner surface.

2. The product of claim 1 wherein the sidewall comprises a first filter layer, a second filter layer, and the outer support layer.

3. The product of claim 2 wherein the first filter layer comprises electrostatically charged electret fibers.

4. The product of claim 3 wherein the second filter layer comprises a melt blown microfiber web.

5. The product of claim 2 wherein the second filter layer comprises a melt blown microfiber web.

6. The product of claim 2, 3, 4, or 5 comprising the first filter layer having a total pressure drop at a flow rate of 85 liters/min between about 1.0 to about 4.0 mm $H_2O$, and the first filter layer having a total basis weight between about 100 to about 300 grams/m$^2$; and the second filter layer having a total pressure drop at a flow rate of 85 liters/min between about 10 to about 18 mm $H_2O$, and the second filter layer having a total basis weight between about 25 to about 75 grams/m$^2$.

7. The product of claim 2, 3, 4, or 5 comprising the first filter layer having a total pressure drop at a flow rate of 85 liters/min between about 0.1 to about 4.0 mm $H_2O$, and the first filter layer having a total basis weight between about 50 to about 450 grams/m$^2$; and the second filter layer having a total pressure drop at a flow rate of 85 liters/min between about 5.5 to about 20 mm $H_2O$, and the second filter layer having a total basis weight between about 15 to about 75 grams/m$^2$.

8. The product of claim 1 wherein the sleeve comprises a nonwoven material.

9. The product of claim 1 wherein the sleeve comprises a pleated material.

10. The product of claim 1 wherein the sleeve sidewall comprises a total pressure drop at a flow rate of 85 liters/min between about 0.05 mm $H_2O$ to about 5.0 mm $H_2O$.

11. The product of claim 10 wherein the sleeve sidewall comprises a total pressure drop at a flow rate of 85 liters/min between about 0.15 mm $H_2O$ to about 0.8 mm $H_2O$.

12. The product of claim 1 wherein the sleeve sidewall comprises a total basis weight between about 10 to about 400 grams/m$^2$.

13. The product of claim 12 wherein the sleeve sidewall comprises a total basis weight between about 40 to about 250 grams/m$^2$.

14. The product of claim 1 wherein the first gap area plus the second gap area is between about 5 cm$^2$ to about 160 cm$^2$.

15. The product of claim 1 wherein the first gap area plus the second gap area is between about 1 cm$^2$ to about 1240 cm$^2$.

16. The product of claim 1 wherein the first gap area plus the second gap area is between about 5 cm$^2$ to about 600 cm$^2$.

17. The product of claim 1 wherein the first gap area plus the second gap area is between about 75 cm$^2$ to about 90 cm$^2$.

18. The product of claim 1 wherein the first gap area plus the second gap area is between about 75 cm$^2$ to about 400 cm$^2$.

19. The product of claim 1 wherein the bag has an area, AB, and the sleeve has an area, AS, and an Area Ratio AS/AB is between about 0.2 to about 0.8.

20. The product of claim 19 wherein the Area Ratio AS/AB is between about 0.4 to about 0.6.

21. The product of claim 1 wherein the coupler comprises a barbed first end, a flange, and a ribbed second end, and the flange is attached to the sidewall such that the ribbed second end resides inside of the first end of the sleeve.

\* \* \* \* \*

UNITED STATES PATENT AND TRADEMARK OFFICE
CERTIFICATE OF CORRECTION

PATENT NO.        : 8,721,402 B2                    Page 1 of 1
APPLICATION NO.   : 12/810247
DATED             : May 13, 2014
INVENTOR(S)       : Edward Woo et al.

It is certified that error appears in the above-identified patent and that said Letters Patent is hereby corrected as shown below:

On Page 2 of the Title Pages, in Column 2, Item (56) under (Other Publications)
Line 10, delete "porta1" and insert -- portal --, therefor.

In the Drawings
On Sheet 3 of 3 of the Drawings, under (Y-Axis)
Line 1, delete "efficinecy" and insert -- efficiency --, therefor.

In the Specification
Column 2
Line 3, delete "$H_20$" and insert -- $H_2O$ --, therefor.
Line 22, delete "$H_20$" and insert -- $H_2O$ --, therefor.
Line 22, delete "$H_20$," and insert -- $H_2O$, --, therefor.

Column 4
Line 2, delete "though" and insert -- through --, therefor.
Line 13, delete "though" and insert -- through --, therefor.

Column 12
Line 33, delete "though" and insert -- through --, therefor.

Column 21
Line 16, delete "bag" and insert -- bag; and --, therefor.
Line 51, delete "1 bf" and insert -- lbf --, therefor.

In the Claims
Column 28
Line 30, in Claim 6, delete "$H_20$," and insert -- $H_2O$, --, therefor.
Line 40, in Claim 7, delete "$H_20$," and insert -- $H_2O$, --, therefor.

Signed and Sealed this
Twenty-third Day of September, 2014

Michelle K. Lee
*Deputy Director of the United States Patent and Trademark Office*